(12) United States Patent
Vincelli

(10) Patent No.: US 10,283,010 B2
(45) Date of Patent: May 7, 2019

(54) SYSTEM AND METHOD FOR INTER-DISCIPLINARY TEACHING CURRICULUM TO COMBINE THE ARTS WITH CORE STUDIES

(71) Applicant: THE GAMES METHOD, LLC, Dallas, TX (US)

(72) Inventor: Joseph Vincelli, Dallas, TX (US)

(73) Assignee: THE GAMES METHOD, LLC, Dallas, TX (US)

( * ) Notice: Subject to any disclaimer, the term of this patent is extended or adjusted under 35 U.S.C. 154(b) by 302 days.

(21) Appl. No.: 15/002,098

(22) Filed: Jan. 20, 2016

(65) Prior Publication Data
US 2017/0206791 A1  Jul. 20, 2017

(51) Int. Cl.
| G09B 1/00 | (2006.01) |
| G09B 15/00 | (2006.01) |
| G09B 1/02 | (2006.01) |
| G09B 5/06 | (2006.01) |

(52) U.S. Cl.
CPC .............. G09B 15/00 (2013.01); G09B 1/02 (2013.01); G09B 5/06 (2013.01)

(58) Field of Classification Search
CPC ... G09B 1/00; G09B 1/18; G09B 1/20; G09B 1/22; G09B 15/00; G09B 15/02; G10G 1/00; G10G 1/02
See application file for complete search history.

(56) References Cited

U.S. PATENT DOCUMENTS

| 2,611,193 A * | 9/1952 | Davis ..................... G09B 19/02 434/196 |
| 4,625,099 A * | 11/1986 | Freedom .................. G06C 3/00 235/78 RC |
| 4,634,385 A * | 1/1987 | Stemper .................. G09B 1/22 434/198 |
| 5,470,234 A * | 11/1995 | Sher ......................... G09B 1/02 434/196 |
| 6,201,769 B1 * | 3/2001 | Lewis ..................... G04F 5/025 368/10 |
| 6,443,796 B1 * | 9/2002 | Shackelford ......... A63H 33/042 273/237 |
| 8,834,167 B2 * | 9/2014 | Spotts ...................... G09F 7/04 434/195 |
| 2015/0356880 A1 * | 12/2015 | Polonen .................. G10C 3/00 84/474 |
| 2016/0203805 A1 * | 7/2016 | Strachan .................. G10G 1/00 84/609 |

\* cited by examiner

*Primary Examiner* — Peter Egloff
(74) *Attorney, Agent, or Firm* — Gregory M. Howison

(57) ABSTRACT

A method for an inter-disciplinary teaching curriculum to combine the arts with core studies, comprising placing within quadrants of a circle, the circle being defined on a surface of an object, a plurality of circular sector objects of various sizes in relation to the circle, the plurality of circular sector objects having displayed thereon a music note according to the size of the particular circular sector object, performing a rhythm depicted by the music notes displayed on the circular sector objects that were placed into the quadrants of the circle, and analyzing a plurality of information displayed on each one of the plurality of circular sector objects, the plurality of information displayed on each one of the plurality of circular sector objects being associated with the size of the particular circular sector object.

15 Claims, 41 Drawing Sheets

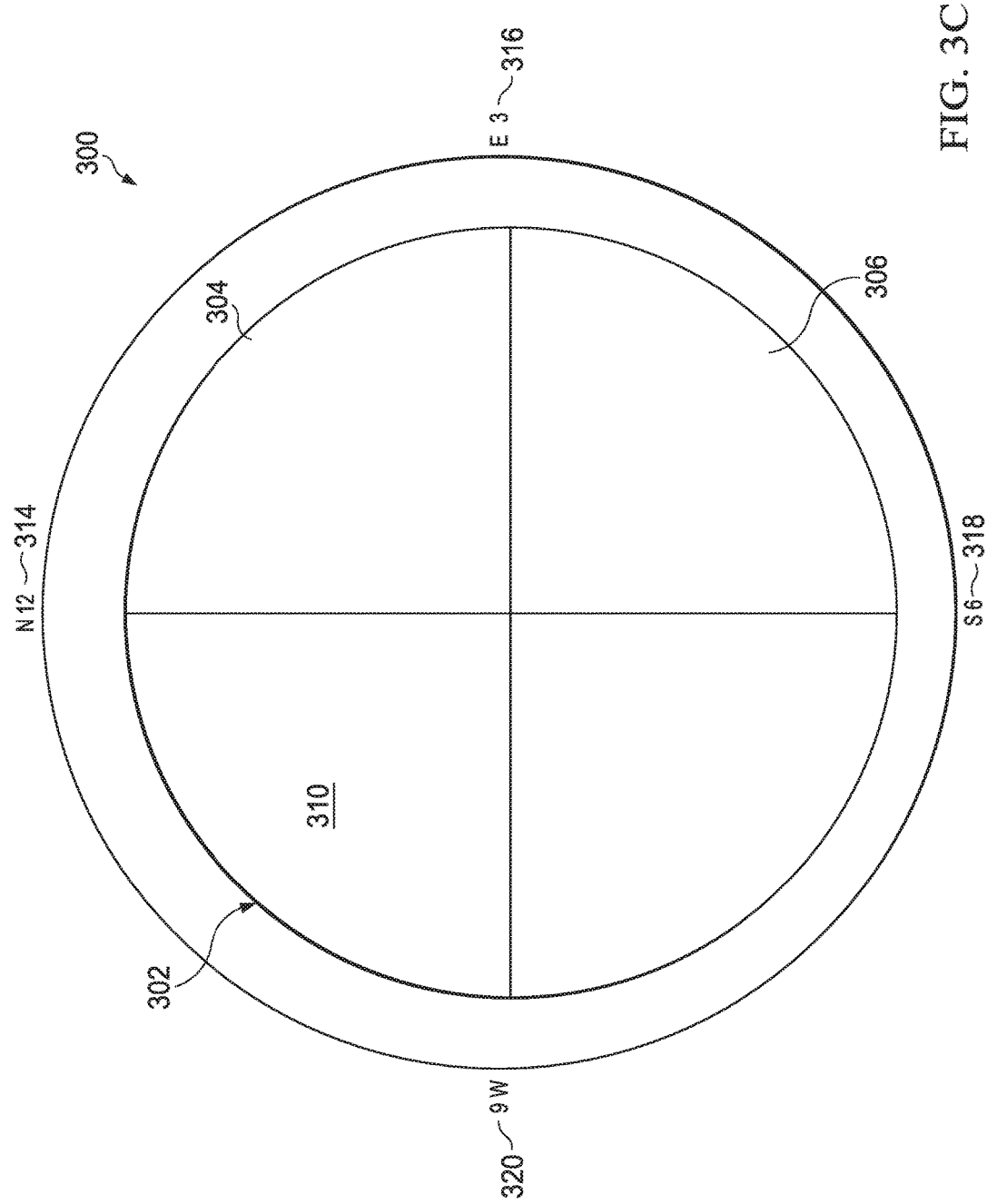

FIG. 14

| Exercise # | Play/Stop | | Sound |
|---|---|---|---|
| 1 | PLAY | STOP | 1 Syllable |
| 2 | PLAY | STOP | 2 Syllables, Accent #1 |
| 3 | PLAY | STOP | 2 Syllables, Accent #2 |
| 4 | PLAY | STOP | 3 Syllables, Accent #1 |
| 5 | PLAY | STOP | 3 Syllables, Accent #2 |
| 6 | PLAY | STOP | 3 Syllables, Accent #3 |
| 7 | PLAY | STOP | 4 Syllables, Accent #1 |
| 8 | PLAY | STOP | 4 Syllables, Accent #2 |
| 9 | PLAY | STOP | 4 Syllables, Accent #3 |
| 10 | PLAY | STOP | 4 Syllables, Accent #4 |
| 11 | PLAY | STOP | 5 Syllables, Accent #1 |
| 12 | PLAY | STOP | 5 Syllables, Accent #2 |
| 13 | PLAY | STOP | 5 Syllables, Accent #3 |
| 14 | PLAY | STOP | 5 Syllables, Accent #4 |
| 15 | PLAY | STOP | 5 Syllables, Accent #5 |
| 16 | PLAY | STOP | 6 Syllables, Accent #1 & #3 |
| 17 | PLAY | STOP | 6 Syllables, Accent #1 & #4 |
| 18 | PLAY | STOP | 6 Syllables, Accent #1 & #5 |
| 19 | PLAY | STOP | 6 Syllables, Accent #2 & #4 |
| 20 | PLAY | STOP | 6 Syllables, Accent #2 & #5 |
| 21 | PLAY | STOP | 6 Syllables, Accent #1, #3, & #5 |
| 22 | PLAY | STOP | Equilateral Pentagon (Sides) |
| 23 | PLAY | STOP | Vocab Exercise Sample |

Rhythmic Vocabulary

Your teacher has provided for you a
Rhythmic Vocabulary Worksheet

For Each Vocabulary Word:
1) Play the assigned Exercise #
2) Sound out the word.
3) Emphasize the *accented* syllables.
4) Be sure to pronounce the word *loudly* and *clearly*
5) Listen for the cowbell count-off in the beginning Here's An Example of Exercise #12:
"Vocabulary" is a 5-Syllable word, Accent is on Beat #2
Hint: For word with up to 5 Syllables,
The Accent ALWAYS falls on the downbeat of 1

Count   1 - 2 - 3 - 4 - 1 - 2 - 3 - 4

OUTCOME:
To build Stronger Diction and Pronunciation
To Build Syllabic Separation

| Exercise # | Play/Stop | | Sound |
|---|---|---|---|
| 1 | PLAY | STOP | 1-4-5 Song Pattern |
| 2 | PLAY | STOP | 1-4-6-4 Song Pattern |
| 3 | PLAY | STOP | 1-5 Song Pattern |
| 4 | PLAY | STOP | 1-5-4-5-6-4 Song Pattern |
| 5 | PLAY | STOP | 1-5-6-4 Song Pattern |
| 6 | PLAY | STOP | 1-6-9-8 Song Pattern |
| 7 | PLAY | STOP | 1-7-6-7 Song Pattern |
| 8 | PLAY | STOP | 2-5-6 Song Pattern |
| 9 | PLAY | STOP | 6-3 Rock Pattern |
| 10 | PLAY | STOP | 6-4-1-3 Pattern |
| 11 | PLAY | STOP | 6-4-3 Pattern |
| 12 | PLAY | STOP | Bears |
| 13 | PLAY | STOP | I Will Run The Race |
| 14 | PLAY | STOP | New Pattern |
| 15 | PLAY | STOP | Rough Riders |
| 16 | PLAY | STOP | Signals of Geometry: TV Mix (no vocals) |

Design Tool Instructions

ONE CLICK to CREATE SCALE
*The Large Boxes* move Scale-Form: The shape doesn't change, but the size can be changed.
TWO CLICKS to INFLUENCE SHAPE
*The Small Boxes* influence the shape: Click a point and Drag your mouse to create any shape.

/\/ STRAIGHT LINE
1. Click your starting point and drag your mouse as far as you want to go
2. Then Double-Click at the point you want to stop
3. You can continue this motion until you create an enclosed polygon shape

∿ CURVED LINE
1. Click your starting point of line
2. Click to place another point of line curve
3. Curve the line as many times as you want. Just click every time you want to place a point
4. Double-Click to finish the line
5. You can continue this motion until you create an enclosed polygon shape or a curved line

Abc_ TEXT
1. Click Abc_ on the toolbar
2. Then click any unused area of the grid
3. Enter the text
4. Once the text is entered, it can be moved anywhere on the screen

🎨 COLOR PALETTE
1. Click on the shape
2. Click the Color Palette Background
3. Move the little black circle (lower left-hand corner) and move to the color you want
4. Click the "CHOOSE" button and your shape will become that color

☰ OUTLINES
Weights, Colors, and Dashes can be changed by clicking on the shape and then clicking on ☰

G ROTATER
1. When a shape is highlighted, it can be rotated and set to any direction
2. Click the inside of the "G" and the shape will rotate in any direction you desire

*OUTCOME:*
To Understand Tessellation and Subdivision
To Build Spatial Reasoning
To Build Creative Association between shapes, sizes, proportions, and subdivision

FIG. 20G

SYSTEM AND METHOD FOR INTER-DISCIPLINARY TEACHING CURRICULUM TO COMBINE THE ARTS WITH CORE STUDIES

TECHNICAL FIELD

This invention relates to teaching systems and methods and, more specifically, to a system, apparatus, and various methods of combining artistic concepts with core academic studies.

BACKGROUND

One of the difficult tasks in teaching is helping students make the connections as to why they need to learn certain concepts. However, differing disciplines actually relate in a variety of ways. With the introduction of robotics and Science, Technology, Engineering, and Mathematics (STEM) design, arts academies, and various forms of art, schools cannot utilize the music and art class as traditionally as they used to. Thus tools are needed to help schools build their own programs while allowing more use of personal and collaborative creativity.

SUMMARY

The present invention disclosed and claimed herein, in one aspect thereof, comprises a method for an inter-disciplinary teaching curriculum to combine the arts with core studies, comprising placing within quadrants of a circle, the circle being defined on a surface of an object, a plurality of circular sector objects of various sizes in relation to the circle, the plurality of circular sector objects having displayed thereon a music note according to the size of the particular circular sector object, performing a rhythm depicted by the music notes displayed on the circular sector objects that were placed into the quadrants of the circle, and analyzing a plurality of information displayed on each one of the plurality of circular sector objects, the plurality of information displayed on each one of the plurality of circular sector objects being associated with the size of the particular circular sector object.

BRIEF DESCRIPTION OF THE DRAWINGS

For a more complete understanding, reference is now made to the following description taken in conjunction with the accompanying Drawings in which:

FIG. 3C illustrates a diagrammatic representation of another embodiment of a rhythm clock tool;

FIG. 14 illustrates one embodiment of a Rhythmic Vocabulary activity GUI;

FIG. 18 illustrates one embodiment of a Song Creation activity GUI;

FIG. 20G illustrates one embodiment of a Designer activity GUI;

DETAILED DESCRIPTION

Figure 1:
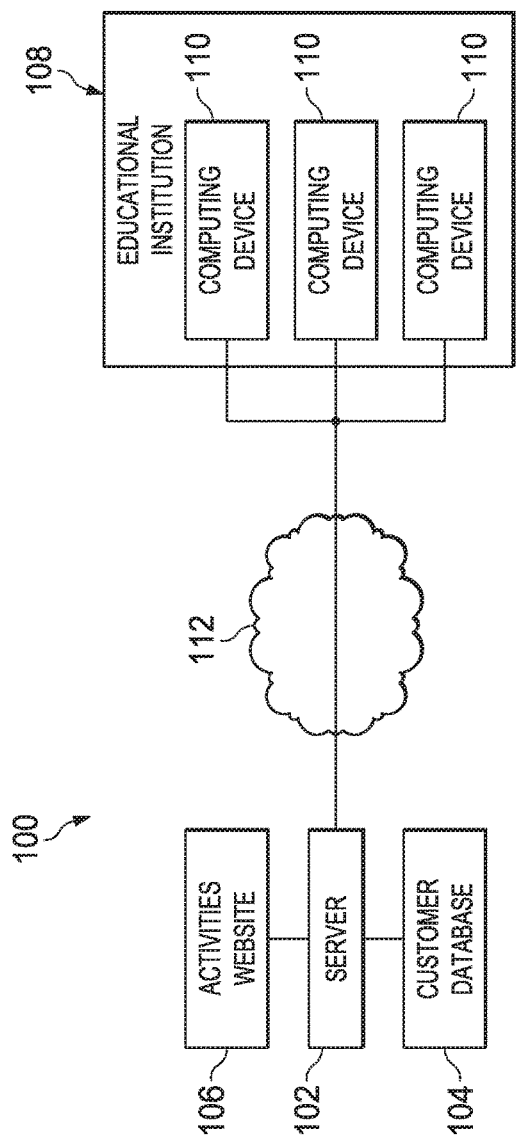
FIG. 1 illustrates a diagrammatic representation of one embodiment of an educational software system.

Referring now to the drawings, wherein like reference numbers are used herein to designate like elements throughout, the various views and embodiments of a system and method for inter-disciplinary teaching curriculum to combine the arts with core studies are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a diagrammatic representation of one embodiment of an educational software system 100. There is shown a server 102 having a customer database 104. The customer database 104 may be used to store customer information pertaining to customers, such as educational institutions that are subscribing to use the educational activity lessons and software. The server 102 may also be used to host an activities website 106, or the activities website 106 may be hosted by a website hosting service, in which case the server 102 would not have the activities website 106 associated with it. There is further shown an educational institution 108 wherein a plurality of computing devices 110 may be configured for Internet access. The computing devices 110 would access the activities website 106 via the Internet 112. Once the activities website 106 is accessed, instructors can, via the plurality of computing devices 110, utilize activities available on the activities website 106. The customer database 104 may further contain login information, such as a username and password, which allows subscribers to access activities contained on the activities website 106.

Figure 2:
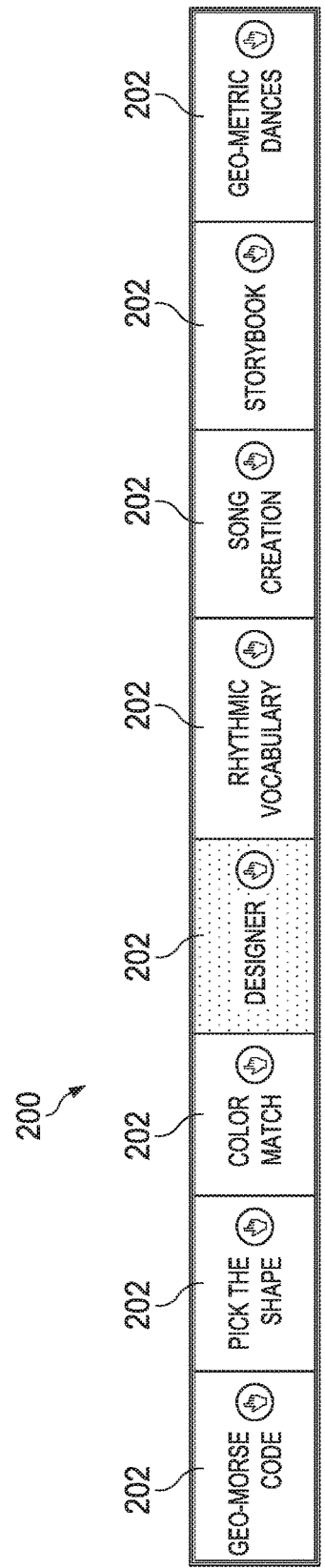
FIG. 2 illustrates one embodiment of an educational activities menu.

Referring now to FIG. 2, there is illustrated one embodiment of an educational activities menu 200. The activities menu 200 is located in the graphical user interface (GUI) of the activities website 106. The activities menu 200 is made up of a plurality of GUI buttons 202. The plurality of GUI buttons 202 correspond to a particular educational activity and contain links to separate locations on activities website 106 where each educational activity is presented. It will be appreciated by one skilled in the art that the activities menu 200 may be made up of any combination of activities and may be updated to include additional activities, or to remove activities, in the list of options presented in the menu.

Figure 3A:
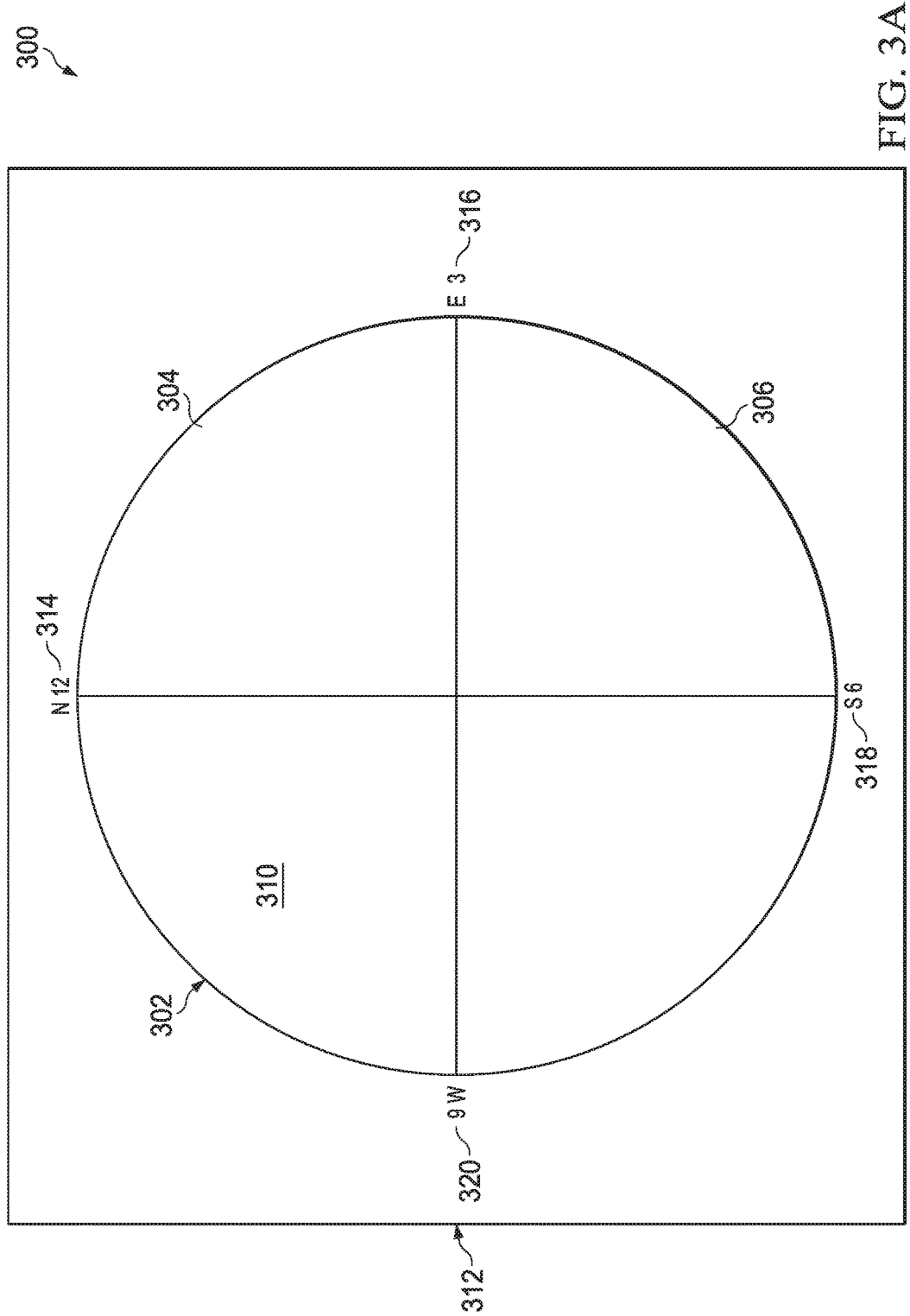
FIG. 3A illustrates a diagrammatic representation of one embodiment of a rhythm clock tool.

Referring now to FIG. 3A, there is illustrated a diagrammatic representation of one embodiment of a rhythm clock tool 300. The rhythm clock tool 300 is an educational tool that combines a number of educational concepts. This results in an interdisciplinary activity that an instructor may perform with the instructor's students to enforce the arts, mathematics, geography, and other disciplines. The rhythm clock tool 300 includes a clock 302, which is a circle divided into quadrants. The quadrants are best ordered in a clockwise orientation, beginning with a first quadrant 304 as the top right quadrant, then a second quadrant 306 as the bottom right quadrant, then a third quadrant 308 as the bottom left quadrant, and ending with a fourth quadrant 310 as the top left quadrant. The clock 302 may be disposed on a flat background 312. The clock 302 also may not have the flat background 312, in which case it could be a circular object that is not disposed on a surface, simply depending on the particular presentation preferences.

The rhythm clock tool 300 further includes information at each of four points of the rhythm clock. A first point 314 is located at the top of the clock 302 between and dividing the first quadrant 304 and the fourth quadrant 310. The first point 314 is labeled with information such as the number "12," representing that the first point 314 corresponds to where 12 o'clock is positioned on the face of a clock (or 0° on a circle). The first point 314 may also be labeled with a capital letter "N" to denote that the first point 314 also corresponds to the location of "North" on a compass. A second point 316 is located on the right side of the clock 302 between and dividing the first quadrant 304 and the second quadrant 306. The second point 316 is labeled with information such as the number "3," representing that the second point 316 corresponds to where 3 o'clock is positioned on the face of a clock (or 90° on a circle). The second point 316 may also be labeled with a capital letter "E" to denote that the second point 316 also corresponds to the location of "East" on a compass. A third point 318 is located at the bottom of the clock 302 between and dividing the second quadrant 316 and the third quadrant 318. The third point 318 is labeled with information such as the number "6," representing that the third point 318 corresponds to where 6 o'clock is positioned on the face of a clock (or 180° on a circle). The third point 318 may also be labeled with a capital letter "S" to denote that the third point 318 also corresponds to the location of "South" on a compass. A fourth point 320 is located on the left side of the clock 302 between and dividing the third quadrant 318 and the fourth quadrant 320. The fourth point 320 is labeled with information such as the number "9," representing that the fourth point 320 corresponds to where 9 o'clock is positioned on the face of a clock (or 270° on a circle). The fourth point 320 may also be labeled with a capital letter "W" to denote that the fourth point 320 also corresponds to the location of "West" on a compass. It will be appreciated that other information may be presented at each of the points 314, 316, 318, and 320 to include and enforce other educational concepts.

The rhythm clock tool 300 may be a physical tool manufactured using various materials such as plywood, Masonite, plastic, or other materials. The rhythm clock tool 300 may also be realized using software, wherein the rhythm clock tool 300 is depicted as an interactable GUI. Such an interactable GUI could be presented on the activities website 106. The rhythm clock tool may also be depicted simply as an animation to be played once the students arrange a rhythm to be played, the process of which is described hereinbelow. The rhythm clock tool 300 may also be depicted as an interactable GUI in an application on a computing device, or even on the screen of a specific manufactured rhythm clock electronic device.

Figure 3B:
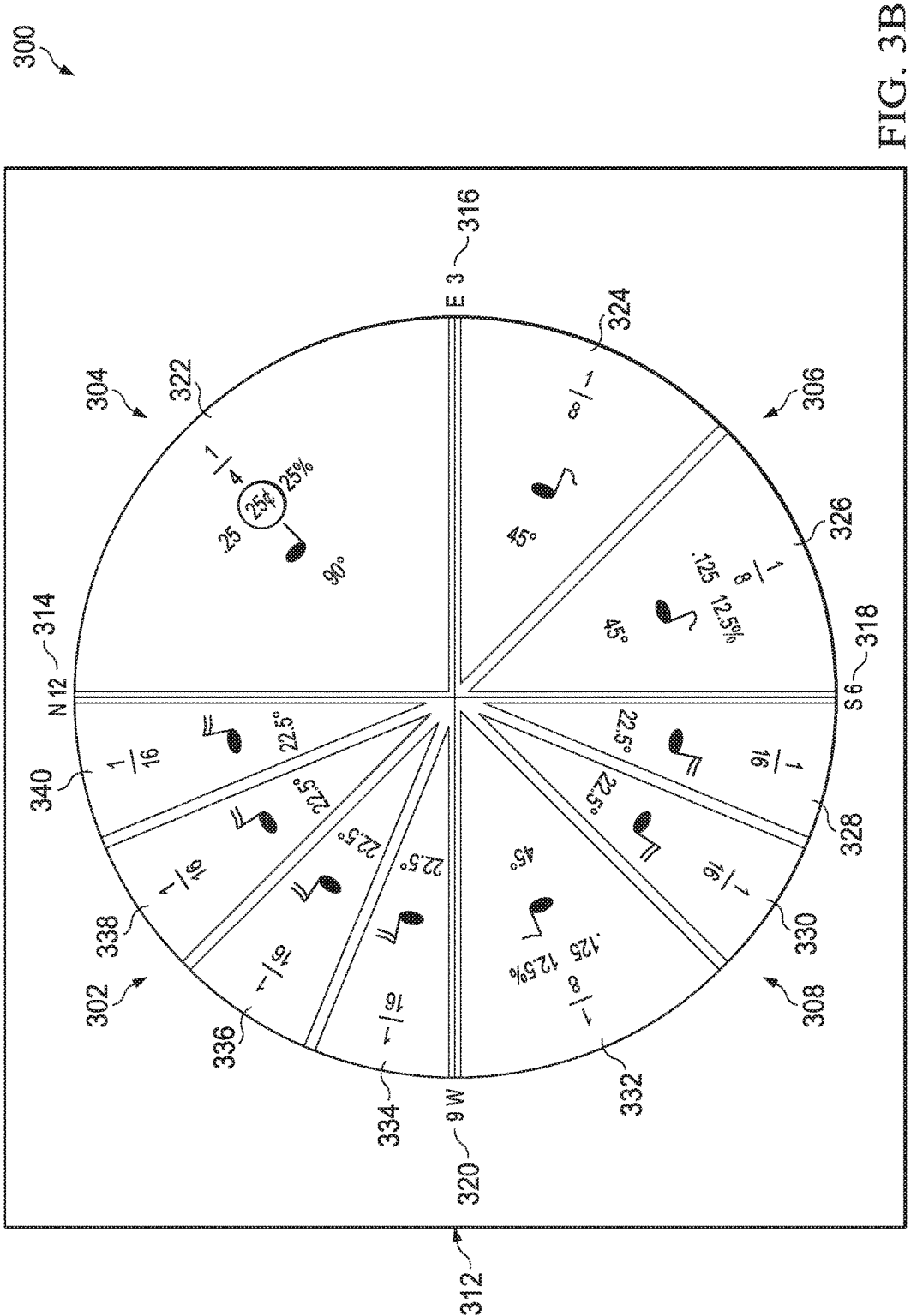
FIG. 3B illustrates another diagrammatic representation of one embodiment of a rhythm clock tool.

Referring now to FIG. 3B, there is illustrated another diagrammatic representation of an embodiment of the rhythm clock tool 300. The rhythm clock tool 300 allows for tile pieces in the shape of a circular sector to be placed in the quadrants 304, 306, 308, and 310. The tile pieces may be of a size that corresponds to a particular fraction of the clock 302, or they may not be the actual size of a particular fraction of the clock 302, but merely represent that fraction. For instance, a quarter-sized tile may actually be the size of one quarter of the clock 302, and thus fit perfectly into a quadrant of the clock 302. However, it may not fit perfectly into a quadrant of the clock 302, in which case it would not be, in actuality, one quarter of the clock 302. For instance, it may only really take up 85%, for example, of a quadrant in which it is placed. Preferably, though, the tile would not be so small as to allow other tiles to be placed into the same quadrant that would not logically fit into the quadrant. For example, a tile that represents a quarter of the clock 302 would preferably not allow a tile that represents an eighth of the clock 302 to also be placed into the same quadrant as the tile that represents a quarter of the clock 302. The tile pieces also correspond to a particular music note length, such as quarter notes, eighth notes, sixteenth notes, whole notes, half notes, and other note lengths if desired. Once each of the quadrants 304, 306, 308, and 310 are filled by tiles, the students can listen to the rhythm, sing the rhythm, clap the rhythm, or utilize the rhythm in other ways. In addition, the tile pieces may contain additional information besides the music note length, such as fractions, decimal numbers, percentages, angle types, angle degrees, money imagery, and time information, such as hours. The tile pieces may be made from materials similar to the rhythm clock tool 300, as described above.

FIG. 3B shows the rhythm clock tool 300 filled with tile pieces. First quadrant 304 contains a quarter note tile 322, which fills the entire first quadrant 304, as a quarter note is equivalent to ¼ of a bar of music when in 4/4 time. Thus, the rhythm clock tool 300 is visually depicting a bar of music in 4/4 time, with each quadrant acting as one beat of time. In this disclosed embodiment, the second quadrant 306 is shown having a first eighth note tile 324 and a second eighth note tile 326. The third quadrant 308 is shown having a first sixteenth note tile 328, a second sixteenth note tile 330, and an eighth note tile 332. The fourth quadrant 310 is shown having a first sixteenth note tile 334, a second sixteenth note tile 336, a third sixteenth note tile 338, and a fourth sixteenth note tile 340. Each of the music note tiles display an image of the note type, in music note notation. Thus, the rhythm created in FIG. 3B is quarter note, eighth note, eighth note, sixteenth note, sixteenth note, eighth note, sixteenth note, sixteenth note, sixteenth note, sixteenth note. This rhythm is all played within four beats of time, with each quadrant being a beat.

As shown in FIG. 3B, each music note tile has various other information that may be on the tile. This allows other concepts from other disciplines and curriculums to be reinforced while using the rhythm clock tool 300. For instance, the quarter note tile 322 that is in the first quadrant 304 in FIG. 3B also shows the angle degrees of the angle of the quarter note tile 322 near the center of the clock 302, which is 90°. The quarter note tile 322 also shows a fraction of ¼, a decimal value of 0.25, a percentage of 25%, and an image of a quarter dollar coin. Other information may also be shown on quarter note tile 322, such as an angle type, such as a right angle in this case, time information, such as "3 hours" since the quarter note tile 322 is shown in first quadrant 304, which correlates to 12-3 on a clock, or other applicable information.

As further examples, the first eighth note tile and second eighth note tile of the second quadrant 306, as well as the eighth note tile of the third quadrant 308, display a fraction of ⅛, a decimal value of 0.125, a percentage of 12.5%, and an angle of 45°. Similarly, the first and second sixteenth notes 328 and 330, respectively, of the third quadrant 308, and the first, second, third, and fourth sixteenth notes 334, 336, 338, and 340, respectively, each show a fraction of 1/16, and an angle of 22.5°. The particular embodiment shown in FIG. 3B does not include other information for the sixteenth note tiles, such as decimals and percentages, because a decimal value of 0.0625, for instance, may be undesired when interacting with students of certain younger age ranges. However, other embodiments may include such information if desired.

Referring now to FIG. 3C, there is illustrated a diagrammatic representation of another embodiment of the rhythm clock tool 300. There is shown in this embodiment that the rhythm clock tool 300 does not reside on a flat background 312, as in the embodiment shown in FIGS. 3A and 3B. Rather, the embodiment shown in FIG. 3C exists as a circular piece without a background piece. Further, the embodiment shown in FIG. 3C also has a recessed middle portion of the circle wherein the quadrants are located. This allows for circular sector pieces to be laid within the recessed portion so that the circular sector pieces are inhibited from sliding off of the rhythm clock tool 300.

Figure 3D:
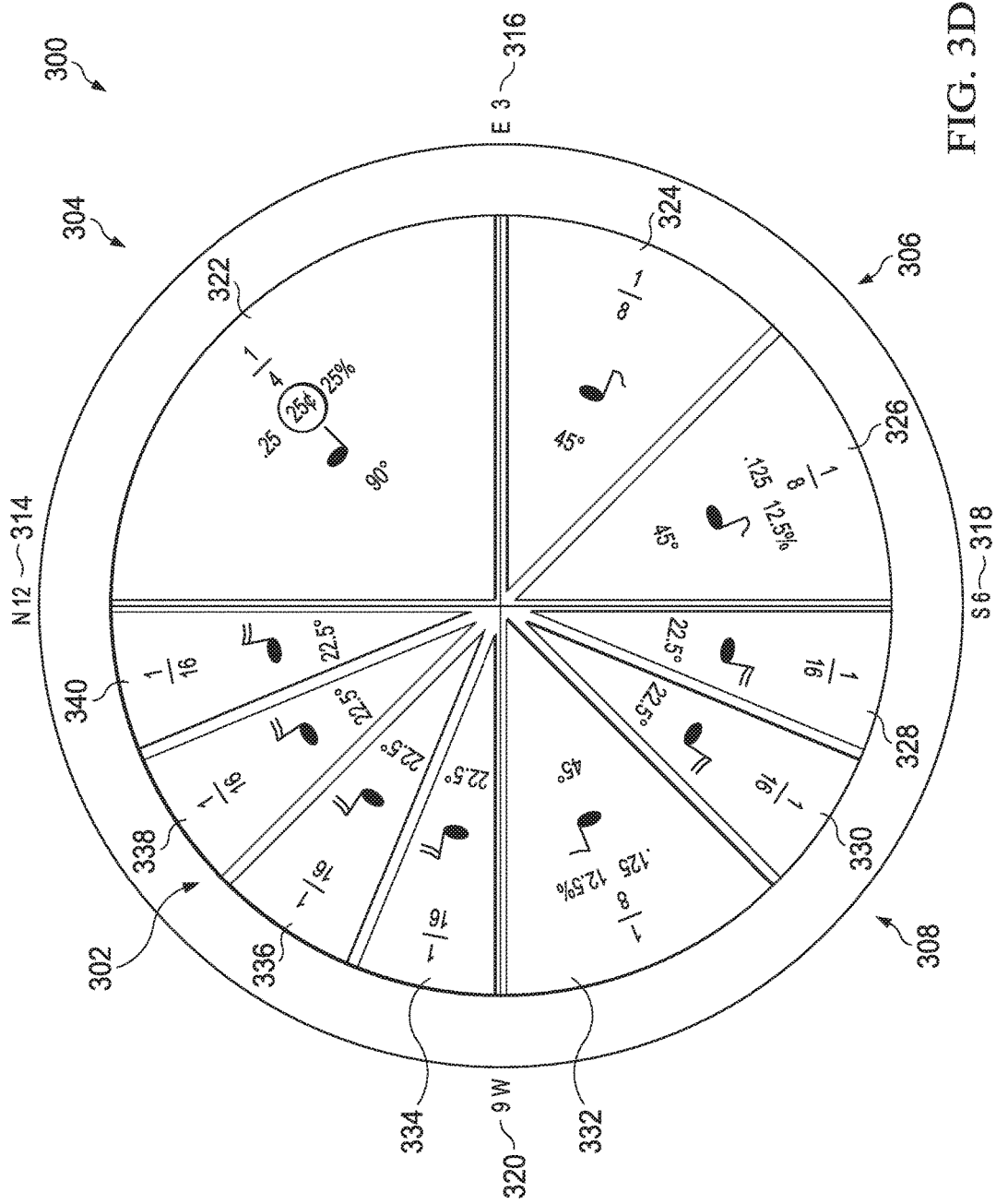
FIG. 3D illustrates another diagrammatic representation of an embodiment of the rhythm clock tool.

Referring now to FIG. 3D, there is illustrated another diagrammatic representation of an embodiment of the rhythm clock tool 300. This shows the same rhythm clock tool 300 as in FIG. 3C with circular sector objects inserted into the quadrants of the recessed center portion. Again, this recessed portion helps to prevent the circular sector objects from sliding around or off of the rhythm clock tool 300.

Figure 4:
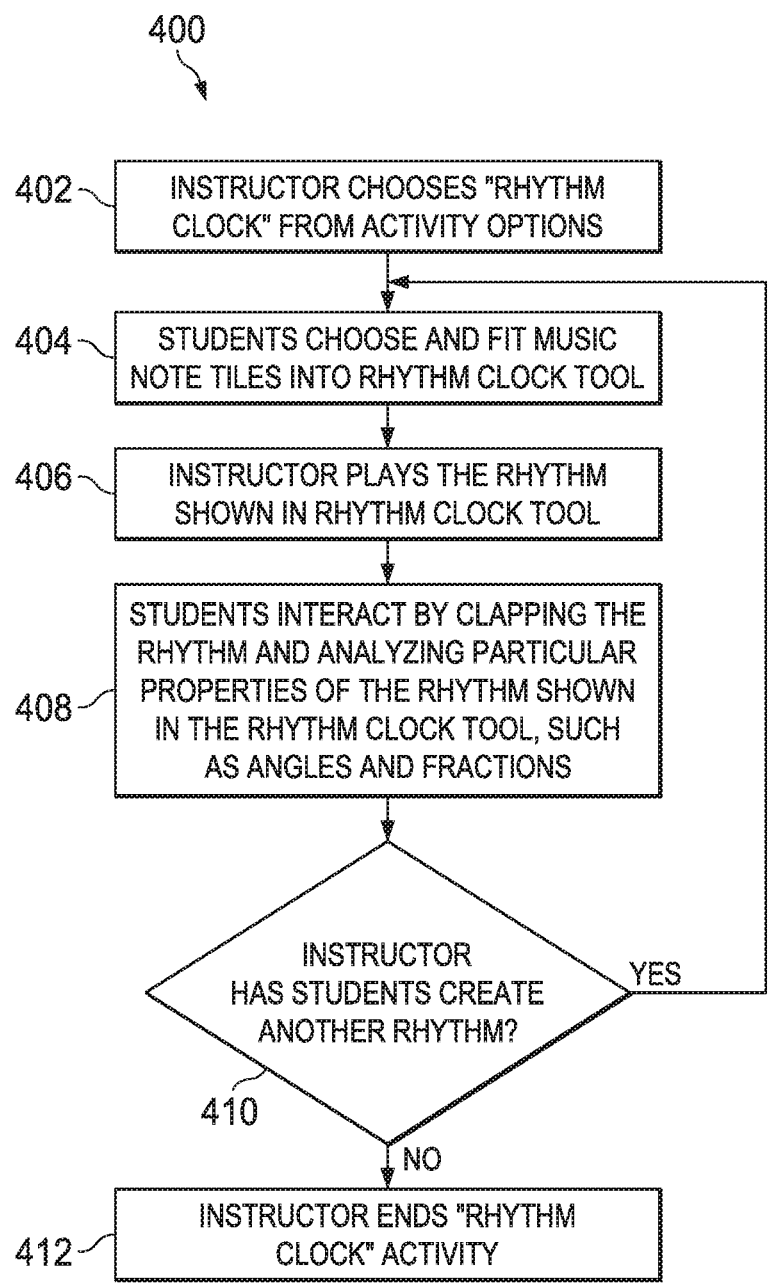
FIG. 4 illustrates a flow diagram of one embodiment of a rhythm clock tool activity method.

Referring now to FIG. 4, there is illustrated a flow diagram of one embodiment of a rhythm clock tool activity method 400. At step 402, the instructor chooses the "rhythm clock" activity form a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 404, a student or multiple students choose music note tiles to fit into the quadrants of the rhythm clock tool 300. Once the rhythm clock tool 300 is filled with music note tiles, the process moves to step 406. At step 406, the instructor plays the rhythm now shown in the rhythm clock tool 300. This may be accomplished in multiple ways. The instructor may sing the rhythm, play the rhythm on an instrument, such as a drum, clap the rhythm, or use some other method of playing the rhythm. Additionally, if the rhythm clock tool 300 is implemented or partially implemented in a digital format, such as on the activities website 106, in a mobile or PC application, or on a specific rhythm clock electronic device, the instructor may select a particular rhythm to be played. If partially implemented digitally, the students may have a physical rhythm clock tool 300 with which to create the rhythm, while the instructor selects a rhythm from a list of available rhythms that encompasses all possible rhythms that could be created with the rhythm clock, the list being in the activities website 106, for example. In such a scenario, after selecting the rhythm to be played in the activities website 106, the computing device being used by the instructor would be equipped to audibly play the rhythm for the students. There may also be presented to the students a visual representation and animation of the rhythm being played. For instance, there could be displayed on a screen an image of the filled rhythm clock with an indicator that moves around the clock as the rhythm is played, or that highlights particular quadrants as the rhythm is played, so that the students can see which notes in the rhythm clock are currently being played. If the rhythm clock tool 300 is fully implemented digitally, the tool may additionally allow students to drag and drop music note tiles into a GUI that depicts the rhythm clock tool 300, or utilize some other method of allowing the students to arrange the tiles in the GUI other than a drag and drop method.

The process then moves to step 408, where the students interact in the activity by clapping, singing, or playing the rhythm in some other format, either as the rhythm plays or when the rhythm is not playing. This allows the students to learn musical rhythms. The students also interact in the activity in step 408 by analyzing the properties of the different music note tiles, as discussed hereinabove, such as the type of music note, angles, fractions, percentages, and other properties, as well as other properties of the clock such as time of day or geographic directions. The instructor may also point out particular properties of the selected tiles. Thus, the students learn musical rhythms, while learning or reinforcing inter-disciplinary concepts such as mathematics, geography, telling time, and other concepts. At decision block 410, the instructor decides whether or not to have the students create another rhythm using the rhythm clock tool 300. If the instructor decides to have the students create another rhythm, the process moves back to step 404. If the instructor decides to not have the students create another rhythm, the process moves to step 412, where the instructor ends the "rhythm clock" activity.

Figure 5A:
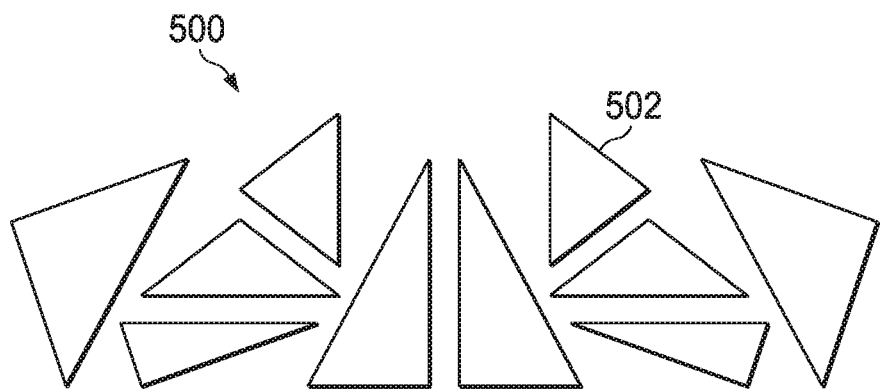
FIG. 5A illustrates a diagrammatic representation of one embodiment of a first step of a geometric dance activity.

Referring now to FIG. 5A, there is illustrated a diagrammatic representation of one embodiment of a first step of a geometric dance activity 500. There is shown a plurality of triangle shapes 502 to be used in the geometric dance activity 500. The plurality of triangle shapes 502 are shown in no apparent configuration or order in FIG. 5A. In some embodiments, the plurality of triangle shapes 502 may be made of various materials, such as plywood, Masonite, cardboard, laminated paper, or other materials. In one embodiment, each one of the plurality of triangle shapes 502 is a right triangle.

Figure 5B:
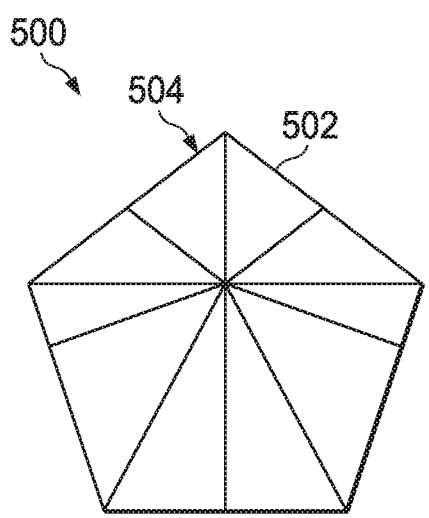
FIG. 5B illustrates a diagrammatic representation of one embodiment of a second step of the geometric dance activity.

Referring now to FIG. 5B, there is illustrated a diagrammatic representation of one embodiment of a second step of the geometric dance activity 500. There is again shown the plurality of triangle shapes 502 arranged into a pentagonal shape 504, preferably on the floor of wherever the activity is being performed. The students will have arranged them into the pentagonal shape 504. This allows the students to learn and reinforce geometric shapes by creating the shapes themselves. It also teaches and reinforces how shapes can be divided into angles, since the students are using the triangles having particular angles to form more complex shapes. The embodiment shown in FIG. 5B again depicts each one of the plurality of triangle shapes 502 as a right triangle. However, in other embodiments, the each one of the plurality of triangle shapes 502 may be an equilateral triangle, wherein it would only require 5 triangle shapes to create a pentagon, rather than 10, as shown in FIG. 5B. There may also be a combination of various types of triangles used to create the more complex shape. It will be appreciated that various shapes other than the pentagonal shape 504 may be created using the plurality of triangle shapes 502.

Figure 5C:
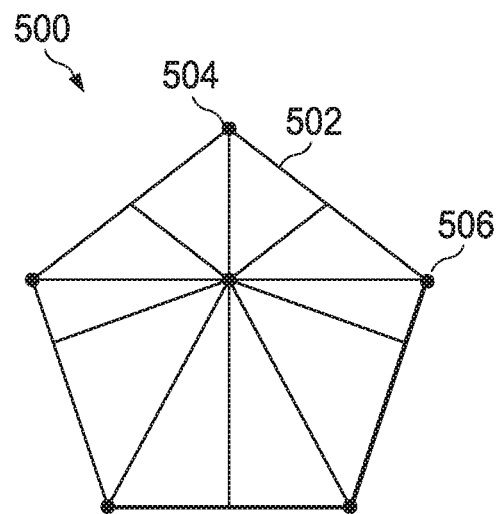
FIG. 5C illustrates a diagrammatic representation of one embodiment of a third step of the geometric dance activity.

Referring now to FIG. 5C, there is illustrated a diagrammatic representation of one embodiment of a third step of the geometric dance activity 500. There is again shown the plurality of triangle shapes 502 arranged into the pentagonal shape 504. There is additionally shown a plurality of dance spots 506, the dance spots being small circular shapes, placed at each of the five points of the pentagonal shape 504, as well as an additional dance spot placed in the center of the pentagonal shape 504. The students will have placed each of the plurality of dance spots 506 at the points of the pentagonal shape 504 after arranging the plurality of triangle shapes 502 into the pentagonal shape 504. In other embodiments, the students may place additional dance spots, such as at each corner of each of the plurality of triangle shapes 502. There may also be no dance spot used in the center of the created shape. In some embodiments, the plurality of dance spots 506 may be made of various materials, such as plywood, laminated paper, felt, foam, or other materials.

Figure 5D:
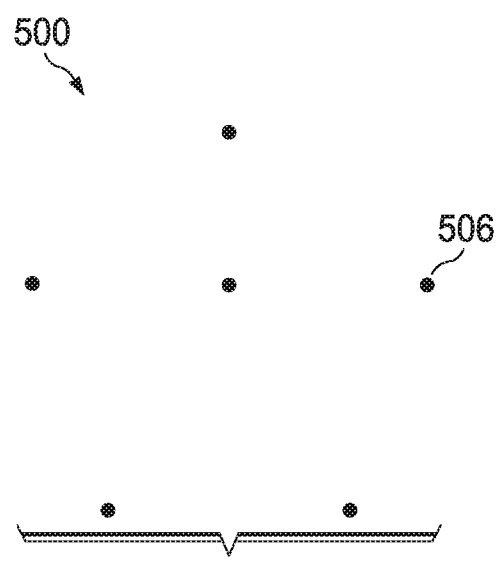
FIG. 5D illustrates a diagrammatic representation of one embodiment of a fourth step of the geometric dance activity.

Referring now to FIG. 5D, there is illustrated a diagrammatic representation of one embodiment of a fourth step of the geometric dance activity 500. In this step, the students will have removed the plurality of triangle shapes 502. Thus, FIG. 5D shows the remaining plurality of dance spots 506 once the plurality of triangle shapes 502 have been removed. The dance spots are used by the students to perform various dances, as will be discussed hereinbelow, with the dance spots serving as an outline for the shape created previously.

Figure 6:
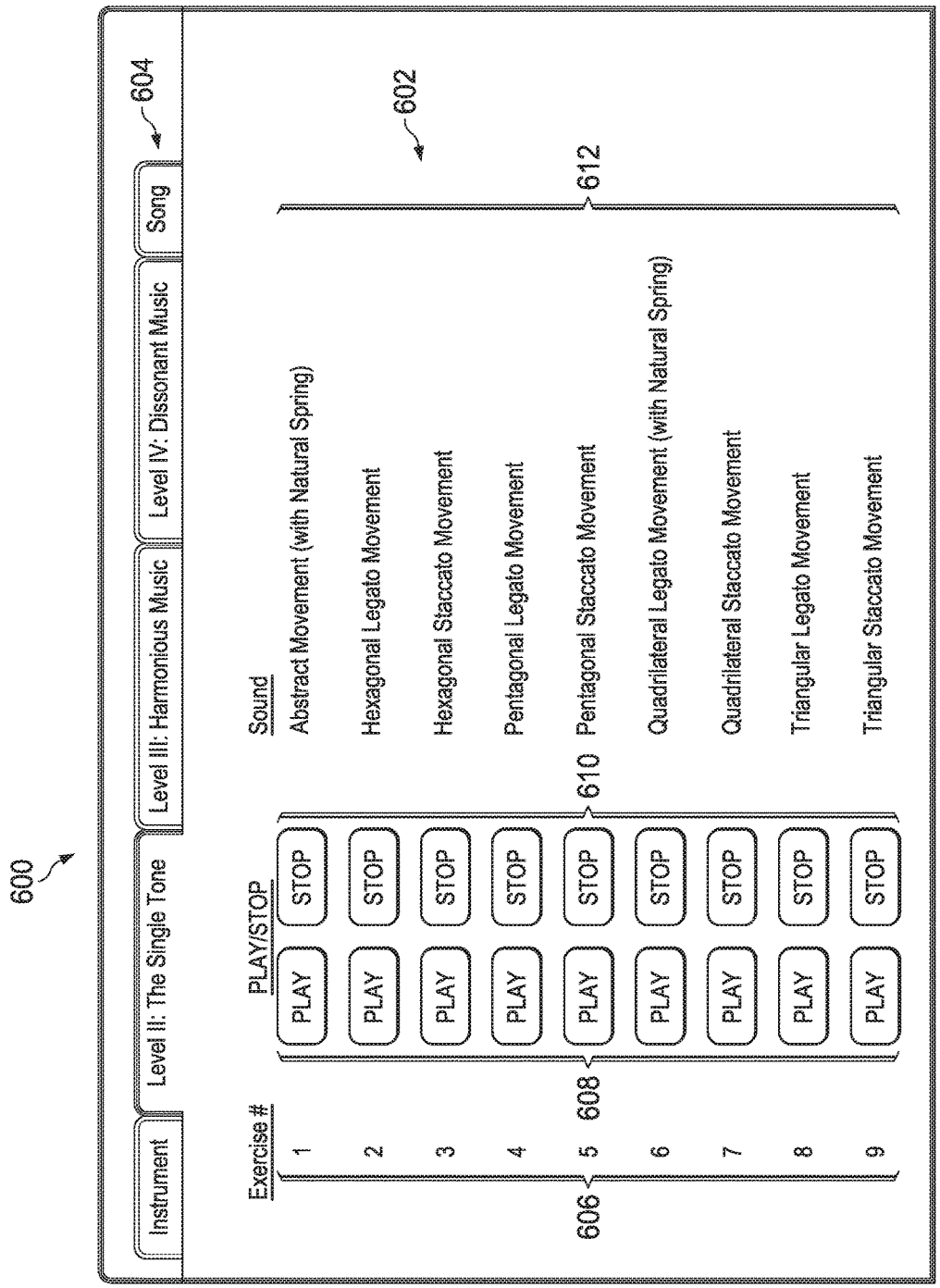
FIG. 6 illustrates one embodiment of a geometric dance Graphical User Interface (GUI)

Referring now to FIG. 6, there is illustrated one embodiment of a geometric dance GUI 600. The geometric dance GUI 600 may be found on the activities website 106, or in another embodiment such as a PC application, or other implementations. The geometric dance GUI 600 includes a list of music and sound selections 602. The list of music and sound selections 602 may be divided into a plurality of categories 604, such as instrumental, single tones, harmonious music, dissonant music, songs, or other categories. The list of music and sound selections 602 may also be organized by a plurality of exercise numbers 606. The plurality of exercise numbers 606 may start over at number 1 for each of the plurality of categories 604, or they may in other embodiments continue sequentially from one category to another. The list of music and sound selections 602 may also have a plurality of "play" GUI buttons 608 and a plurality of "stop" GUI buttons 610, one for each music or sound selection. The list of music and sound selections 602 may also have a plurality of music or sound titles 612, one for each music or sound selection.

Figure 7:
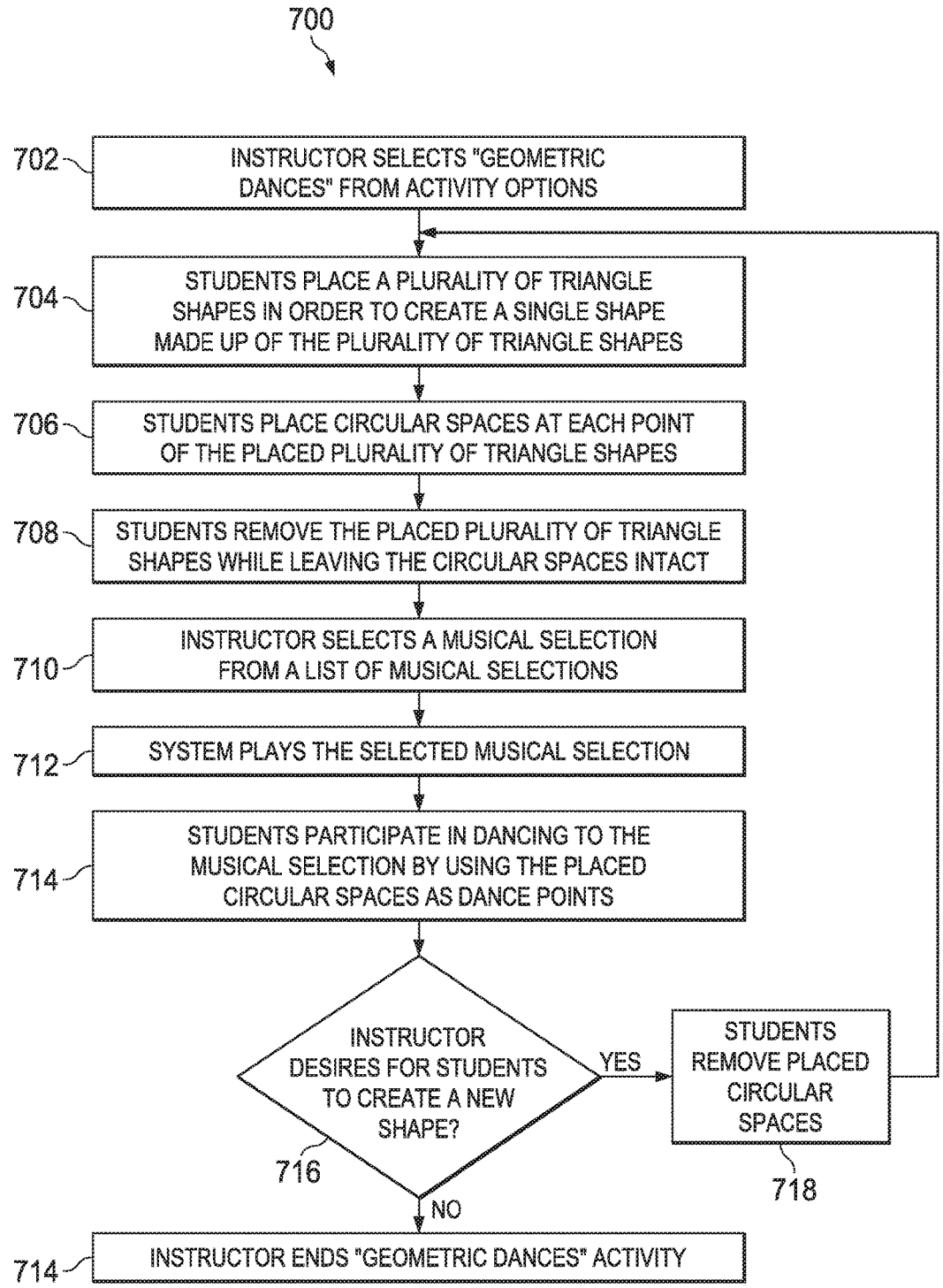
FIG. 7 illustrates a flow diagram of one embodiment of a geometric dance activity method.

Referring now to FIG. 7, there is illustrated a flow diagram of one embodiment of a geometric dance activity method 700. At step 702, the instructor selects "geometric dances" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 704, students arrange a plurality of triangle shapes in order to create a single shape made up of the plurality of triangle shapes. At step 706, the students place circular dance spots at each point of each of the plurality of triangle shapes. As described hereinabove, the students may not place a circular dance spot at every point of every one of the plurality of triangle shapes, but, generally, the goal is to have the students outline the created, more complex, shape. At step 708, the students remove the plurality of triangle shapes while leaving the circular dance spots on the floor in the same locations they were places originally. At step 710, the instructor selects a musical selection from a list of musical selections, such as that described in FIG. 6. At step 712, the system, such as a computing device equipped with speakers being used by the instructor, plays the selected musical selection.

At step 714, the students participate in dancing to the musical selection by using the placed circular dance spots. How the students perform the dances, and how the students utilize the circular dance spots, largely depends on the type of music or sound selection being played, as well as instructor input. Certain music or sound selections may dictate the way the students perform the dance, such as the selections shown in FIG. 6, such as the selections title "Pentagonal Legato Movement" and "Pentagonal Staccato Movement." For instance, the students may perform more flowing or ballet type dances when the "Pentagonal Legato Movement" selection is chosen, with the students gliding between the various circular dance spots. If the "Pentagonal Staccato Movement" selection is chosen, the students may perform more forceful and direct movements to each circular dance spot, such as leaping between the circular dance spots. It will be appreciated that the particular type of dance used may vary greatly, with the circular dance spots acting as reference points. The goal of the geometric dance activity is to merge dance with geometry, teaching and reinforcing both the art of dance and the principles of geometry.

The method 700 then moves to decision block 716, where the instructor decides whether to have the students create a new shape to be used in the geometric dance activity. If the instructor decides to have the students create a new shape, the process moves to step 718, where the students remove the previously place circular dance spots. The process would then move from step 718 back to step 704. If the instructor decides to not have the students create a new shape, the process moves to step 720 where the instructor ends the geometric dance activity.

Figure 8A:
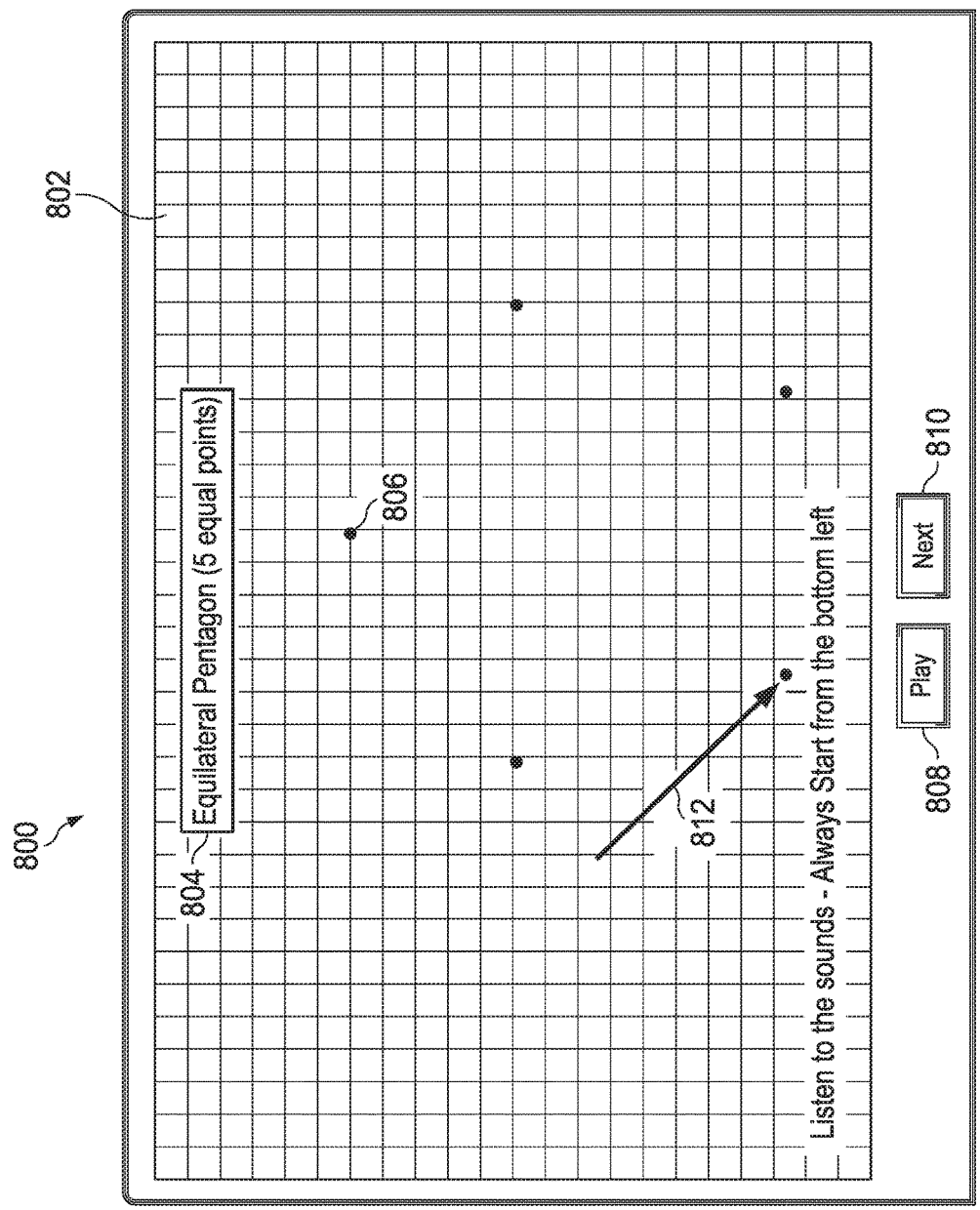
FIG. 8A illustrates one embodiment of a "Geo-Morse Code" activity GUI.
Figure 8B:
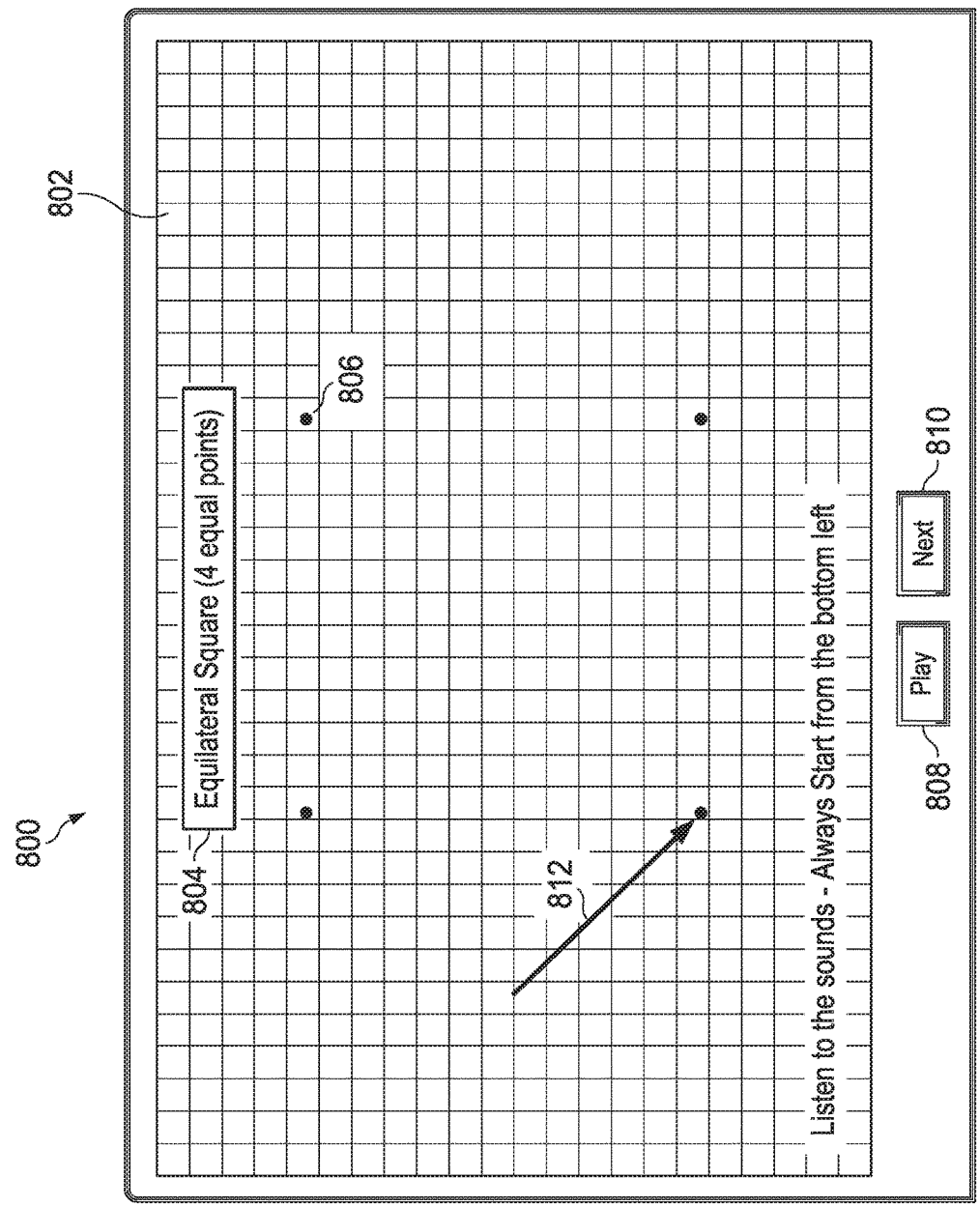
FIG. 8B illustrates one embodiment of a "Geo-Morse Code" activity GUI.
Figure 8C:
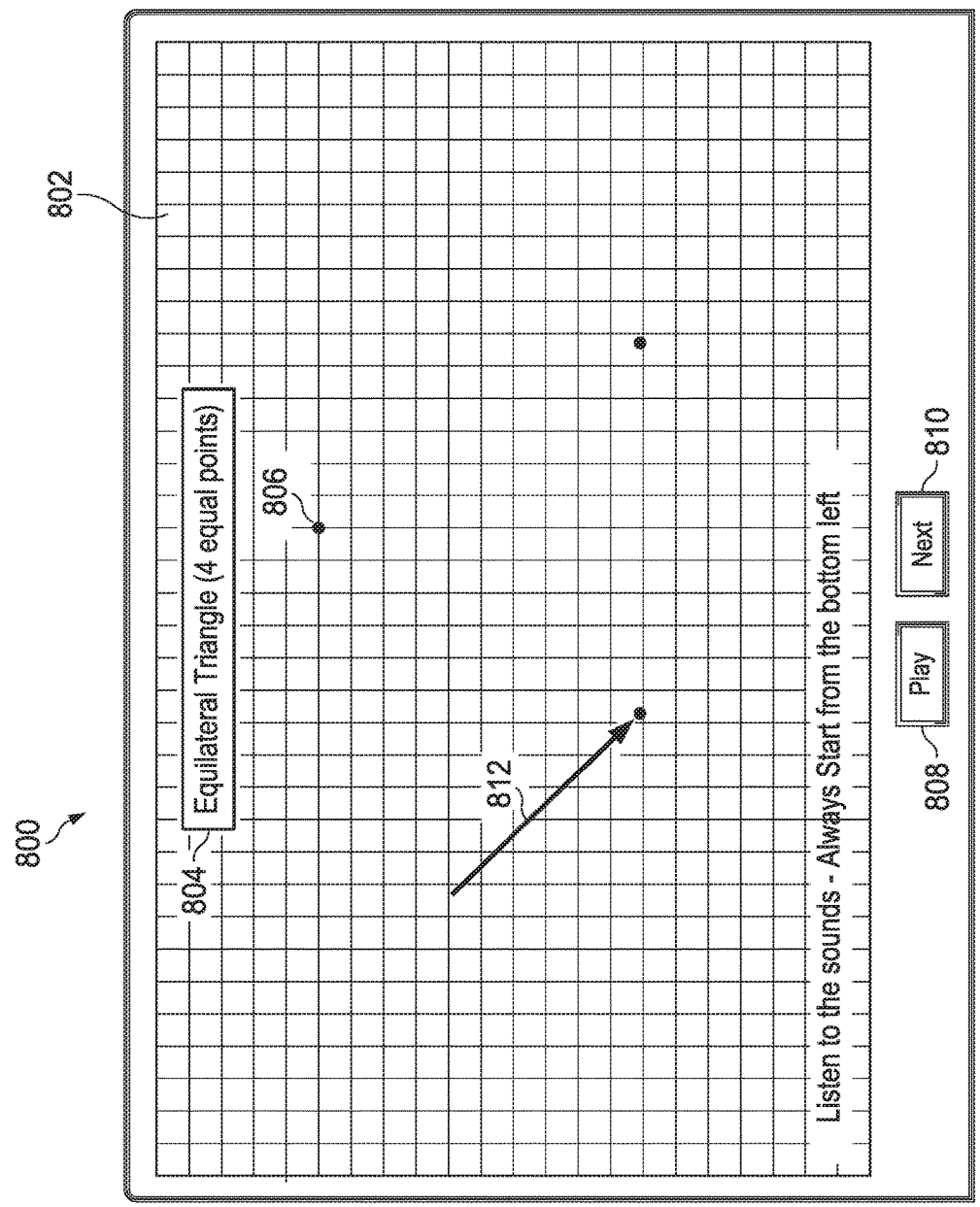
FIG. 8C illustrates one embodiment of a "Geo-Morse Code" activity GUI.
Figure 8D:
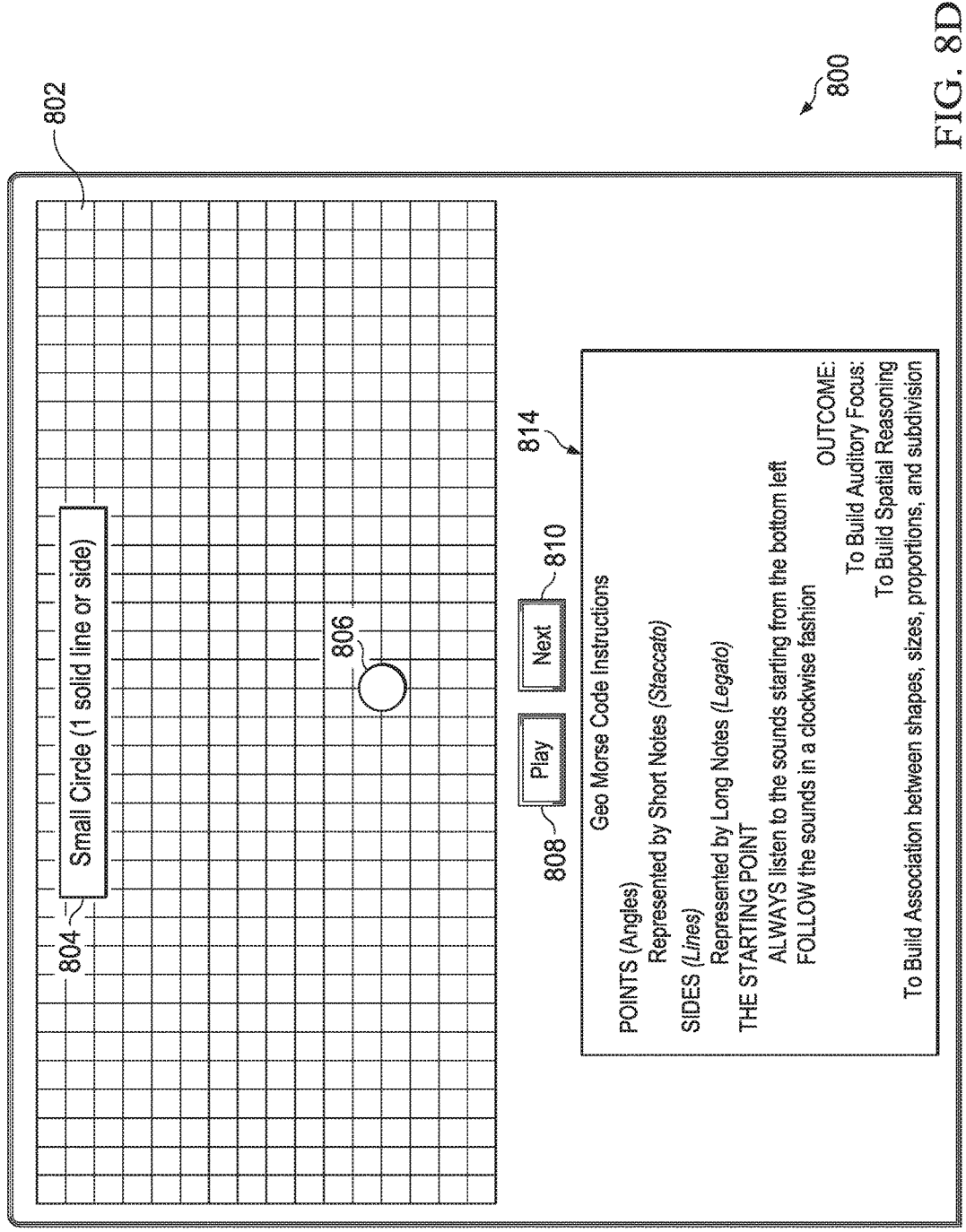
FIG. 8D illustrates one embodiment of a "Geo-Morse Code" activity GUI.

Referring now to FIGS. 8A-8D, there are illustrated embodiments of a "Geo-Morse Code" activity GUI 800. The GUI 800 includes a grid background 802, with a title bar 804 centered horizontally at the top of the grid background 802. The title bar 804 displays the name of a particular shape, such as an equilateral pentagon as shown in FIG. 8A, a square as shown in FIG. 8B, a triangle as shown in FIG. 8C, a circle as shown in FIG. 8D, or other shapes. The grid background 802 further includes one or more points 806. The one or more points 806 are arranged to be the points of the shape that corresponds to the shape listed in the title bar 804. For instance, in FIG. 8A, the one or more points 806 are five points that are arranged to be the points of an equilateral pentagon. The GUI 800 further includes a "Play" button 808 and a "Next" button 810. The "Play" button 808, when selected, causes a system, such as a computing device equipped with speakers, to play a series of beep sounds, the number of beep sounds corresponding to the number of the one or more points 806. The "Next" button 810 causes the GUI to display a new shape. The new shape may be predetermined, or it may be randomly selected from a plurality of available shapes.

During a "Geo-Morse Code" activity, students will not be able to see the GUI 800. An instructor presses the "Play" button 808 in order to have the system play the series of beep sounds. The students then attempt to draw the shape they hear. Students are to always start at the bottom left of the paper and move clockwise while drawing, as indicated by the indicator arrow 812. Short beep sounds, or staccato notes, indicate to the students that they are drawing points of the shape, similar in appearance to the one or more points 806 shown in FIGS. 8A-8D. Long beep sounds, or legato notes, indicate to the students that they are to draw lines, resulting in a full outlined shape rather than a shape with only the points drawn. For drawing circles, a short beep would indicate a small circle, while one long beep would indicate a wider circle, depending on the length of the beep. The GUI 800 may include detailed instructions for performing the activity, as shown in the instruction set 814 in FIG. 8D. The purpose of the Geo-Morse Code activity is to build auditory focus, spatial reasoning, and to build associations between shapes, sizes, proportions, and subdivisions of shapes.

Figure 9:
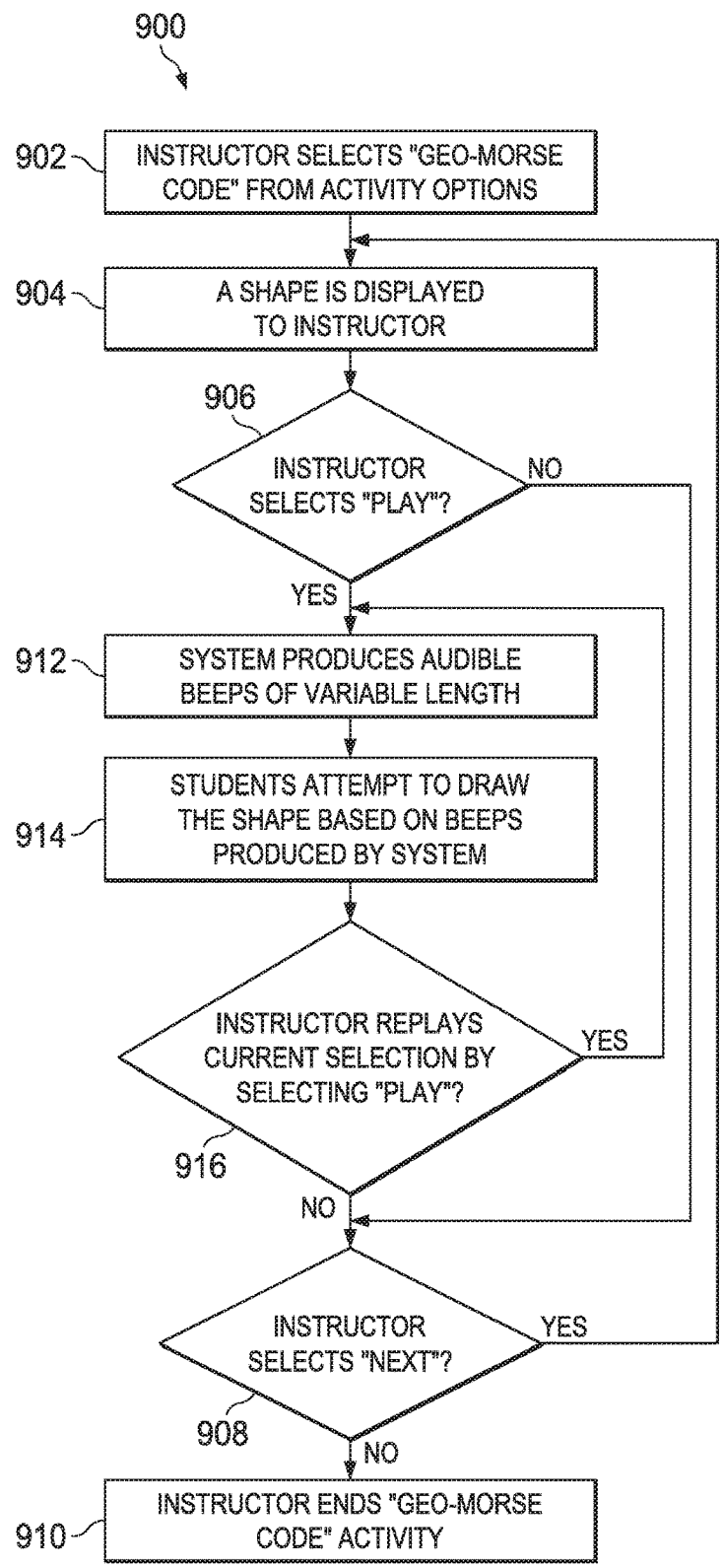
FIG. 9 illustrates a flow diagram of one embodiment of a Geo-Morse Code activity method.

Referring now to FIG. 9, there is illustrated a flow diagram of one embodiment of a Geo-Morse Code activity method 900. At step 902, the instructor selects "Geo-Morse Code" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 904, a shape is displayed to the instructor. At decision block 906, the instructor decides whether to select a "Play" button. If the instructor does not select "Play" the process moves to decision block 908, where the instructor decides whether to select a "Next" button. If the instructor selects the "Next" button, the process moves back to step 904, where another shape is displayed. The new shape displayed may be predetermined, or it may be randomly chosen from a plurality of available shapes. If, at decision block 908, the instructor decided not to select "Next," the process moves to step 910, where the instructor ends the Geo-Morse Code activity.

However, if, at decision block 906, the instructor chooses to select "Play," the process moves to step 912. At step 912, a system, such as a computing device equipped with speakers, produces audible beeps of variable length. At step 914, students attempt to draw the shape displayed to the instructor by only listening to the audible beeps produced by the system. How the students draw the shape based on the beeps is described hereinabove with regards to FIGS. 8A-8D. At decision block 916, the instructor decides whether to replay the beeps for the current shape by selecting "Play" again. If the instructor decides to do so, the process moves back to step 912. If the instructor decides not to do so, the process moves back to decision block 908.

Figure 10:
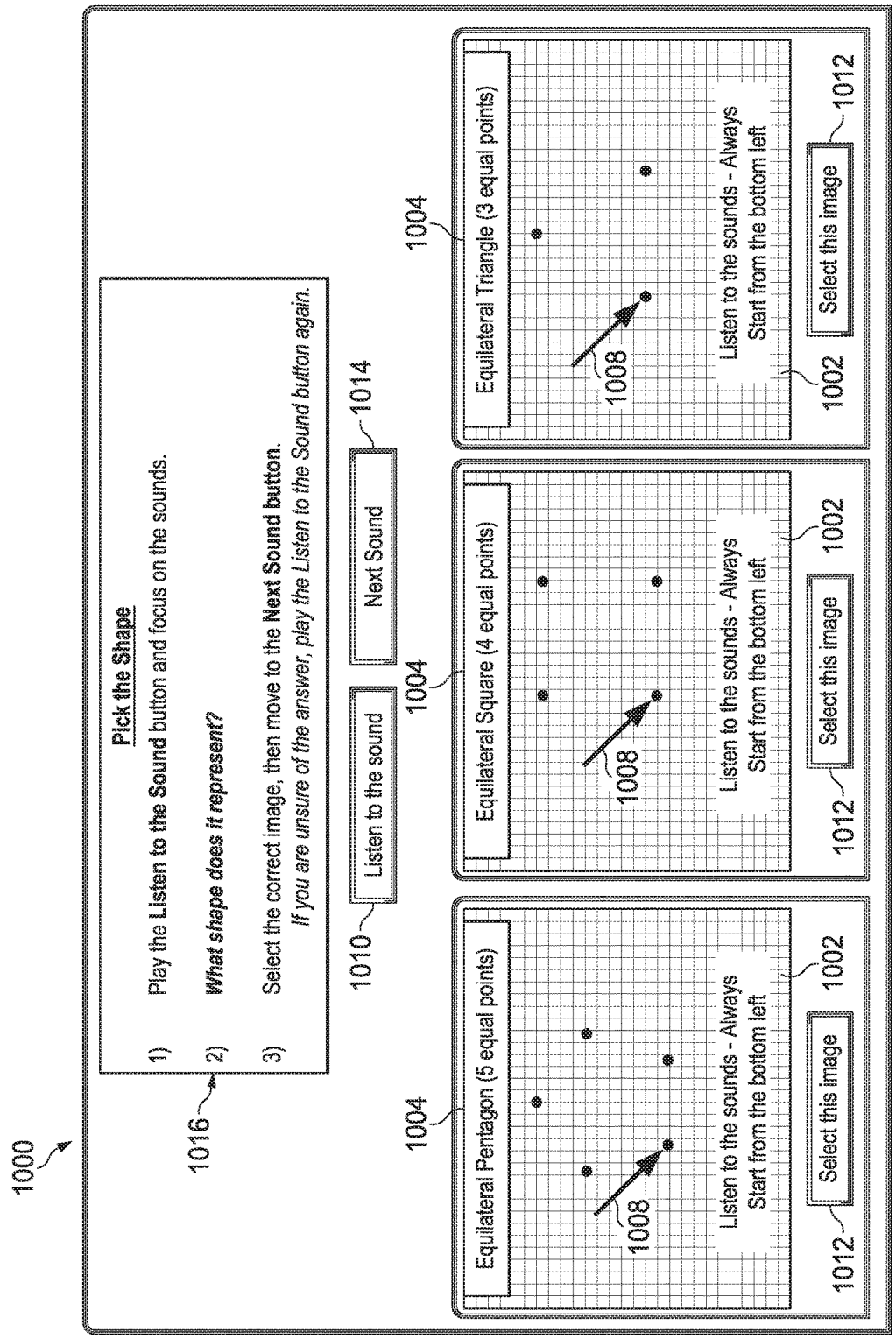
FIG. 10 illustrates one embodiment of a "Pick the Shape" activity GUI.

Referring now to FIG. 10, there is illustrated one embodiment of a "Pick the Shape" activity GUI 1000. The GUI 1000 includes a plurality of shape grids 1002. Each one of the plurality of shape grids 1002 includes a title bar 1004. The tile bar 1004 displays the name of a particular shape, with each title bar 1004 of each one of the plurality of shape grids 1002 displaying a different shape name. The plurality of shape grids 1002 further includes one or more points 1006. The one or more points 1006 make up the points of particular shapes, with each one of the plurality of shape grids 1002 having a different shape shown by the one or more points 1006. For example, as shown in FIG. 10, one of the plurality of shape grids 1002 shows five points, indicating a pentagon, while another one of the plurality of shape grids 1002 shows four points, indicating a square, and another one of the plurality of shape grids 1002 shows three points, indicating a triangle. It will be appreciated that any number of shape grids may be used, to allow for a number of different shapes to be shown.

Each one of the plurality of shape grids 1002 further include an indicator arrow 1008, indicating that the activity requires starting at the bottom left point for the indicated shape. The GUI 1000 further includes a "Listen to the sound" button 1010. The "Listen to the sound" button 1010 causes a system, such as a computing device equipped with speakers, to play a series of audible beeps. Students listening to the beeps attempt to select the shape indicated by the number of beeps played from the plurality of shape grids 1002 currently displayed to the students. To accomplish this, each one of the plurality of shape grids 1002 has a "Select this image" button 1012 located beneath each one of the plurality of shape grids 1002. If the correct shape is selected, the GUI 1000 will display a message indicating that the correct shape was selected. If an incorrect shape is selected, the GUI 1000 will display a message indicating that the incorrect shape was selected. The GUI 1000 further includes a "Next Sound" button 1014, which will cause the GUI 1000 to display a different set of the plurality of shape grids 1002, while also providing a different series of sounds when the "Listen to the sound" button 1010 is selected. This basically allows the instructor to continue the activity by giving the students a new attempt at selecting a shape based on the sounds played. Additionally, the GUI 1000 may also include an instruction set 1016, which is a portion of the GUI that details how to use the "Pick the Shape" activity.

Figure 11:
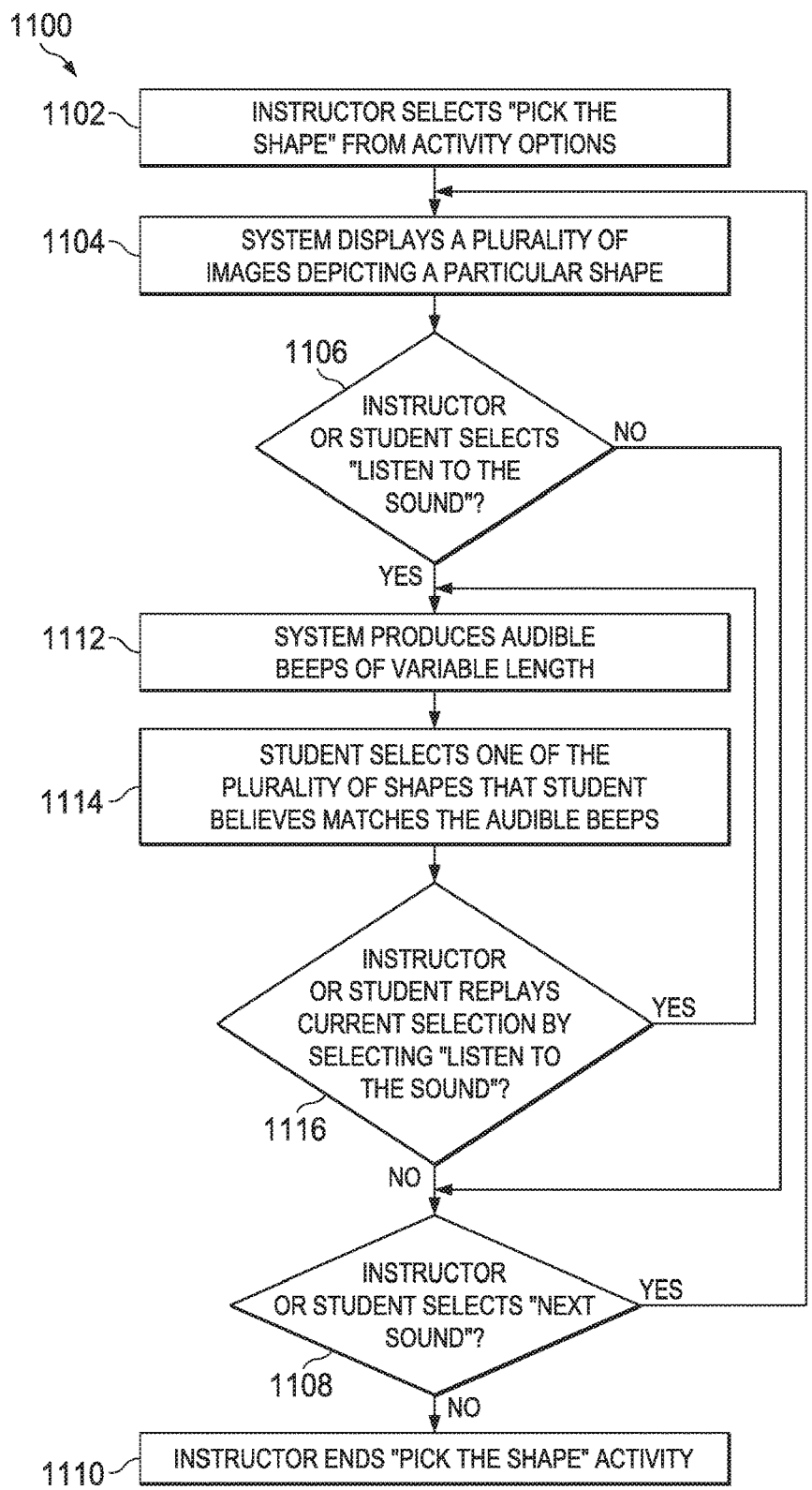
FIG. 11 illustrates a flow diagram of one embodiment of a Pick the Shape activity method.

Referring now to FIG. 11, there is illustrated a flow diagram of one embodiment of a Pick the Shape activity method 1100. At step 1102, the instructor selects "Pick the Shape" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 1104, a plurality of shapes is displayed to an instructor and the instructor's students. At decision block 1106, the instructor or a student decides whether to select a "Listen to the sound" button. If the "Listen to the sound" button is not selected, the process moves to decision block 1108, where the instructor or student decides whether to select a "Next Sound" button. If the "Next Sound" button is selected, the process moves back to step 1104, where a new plurality of shapes is displayed. The new plurality of shapes displayed may be predetermined, or it may be randomly chosen from a plurality of available shapes. If, at decision block 1108, the instructor or student decided not to select "Next Sound," the process moves to step 1110, where the instructor ends the Pick the Shape activity.

However, if, at decision block 1106, the instructor or student chooses to select "Listen to the Sound," the process moves to step 1112. At step 1112, a system, such as a computing device equipped with speakers, produces a series of audible beeps. At step 1114, a student selects one of the plurality of shapes that the student believes matches the audible beeps. The shapes may have single points, where the correct shape is the one that has single points that match the number of beeps played by the system, or the shapes may be outlined shapes, where the correct shape is the one that has lines outlining a shape, where the number of lines matches the number of beeps. The beeps may be short, staccato, beeps, indicating single points, or they may be longer, legato, beeps, indicating lines. At decision block 1116, the instructor or student decides whether to replay the beeps for the current shape by selecting "Listen to the sound" again. If the instructor or student decides to do so, the process moves back to step 1112. If the instructor decides not to do so, the process moves back to decision block 1108.

Figure 12A:
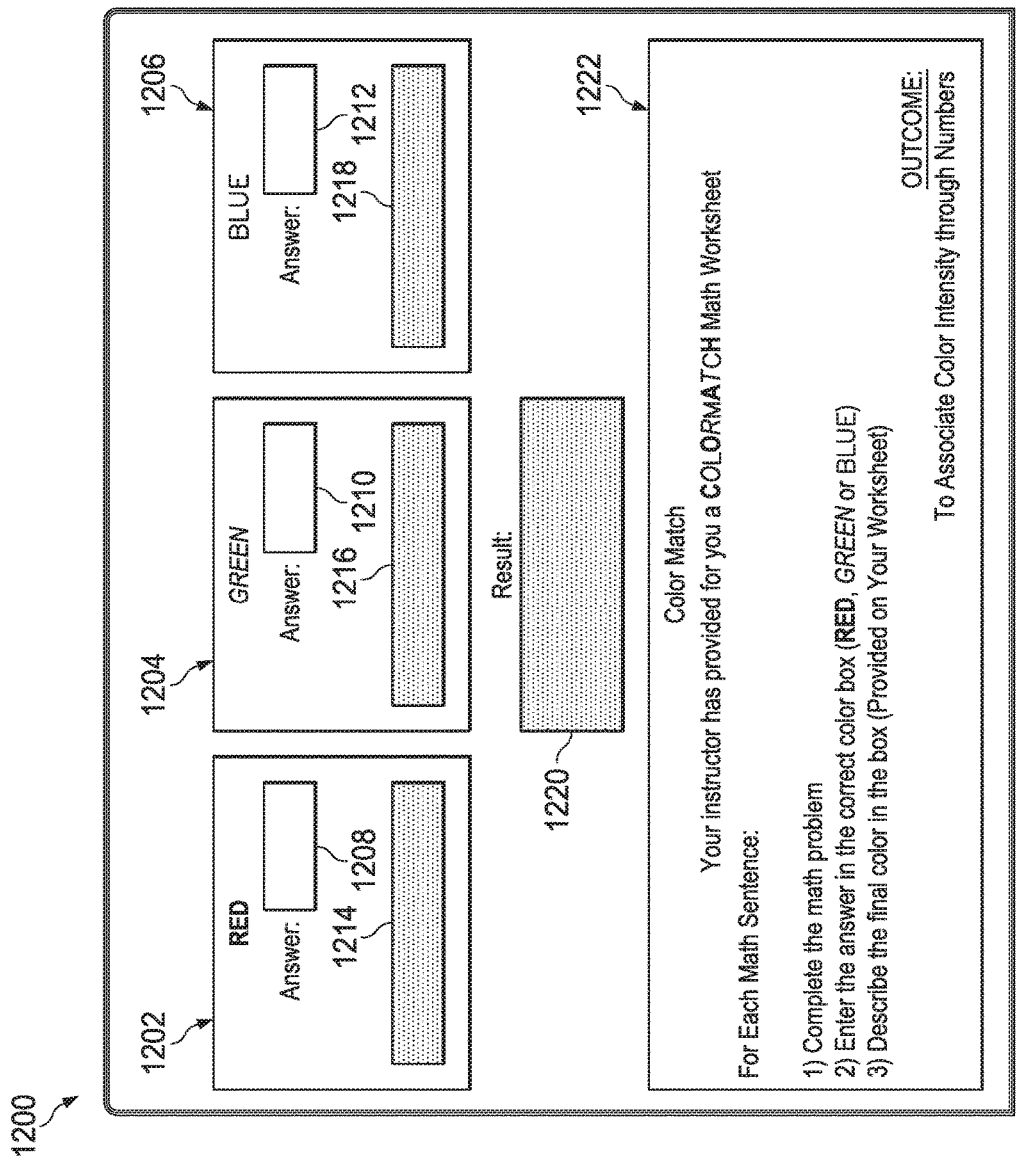
FIG. 12A illustrates one embodiment of a Color Match activity GUI.
Figure 12B:
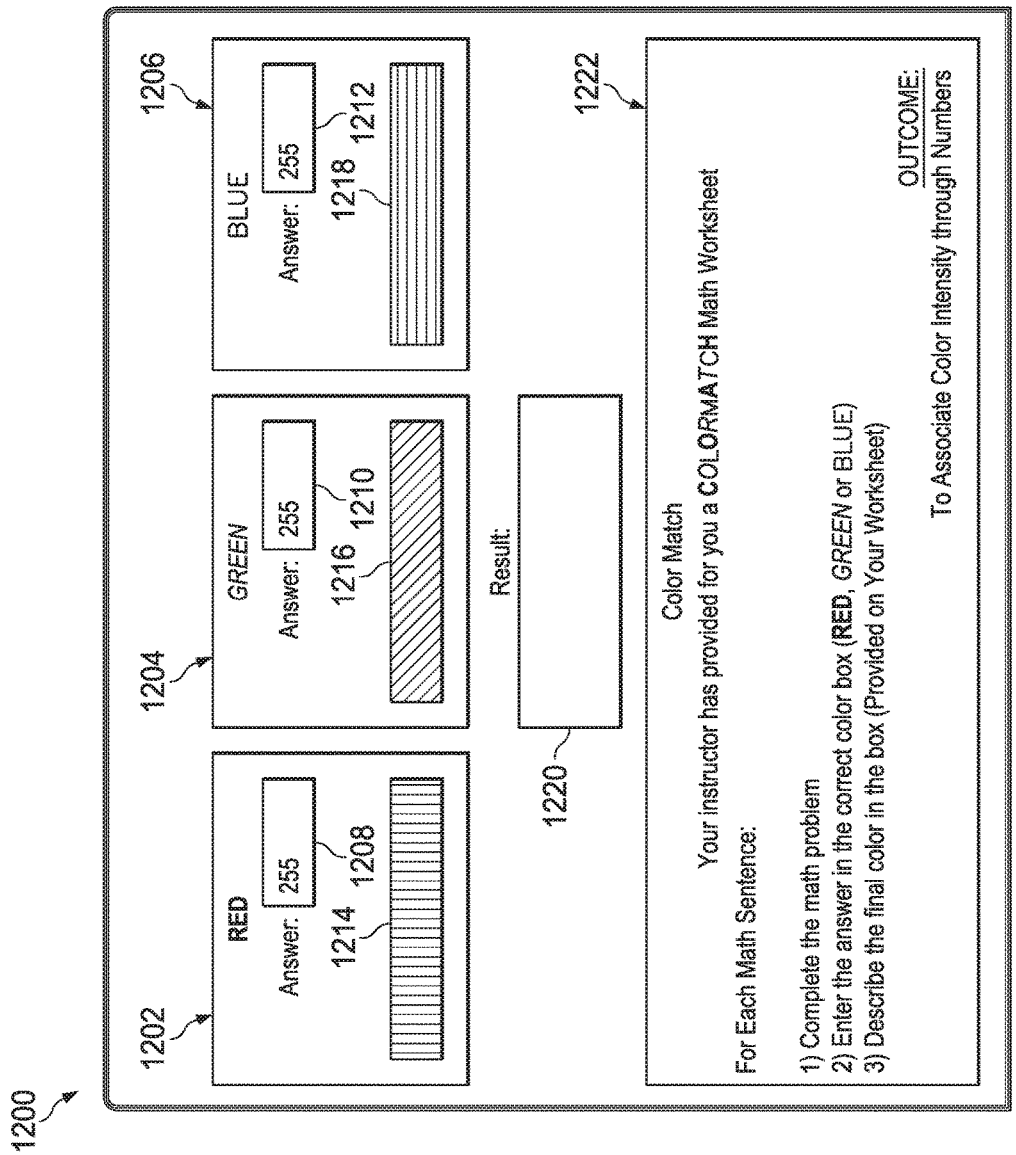
FIG. 12B illustrates one embodiment of a Color Match activity GUI.

Referring now to FIGS. 12A and 12B, there is illustrated one embodiment of a Color Match activity GUI 1200. The GUI 1200 includes a first "Red" answer section 1202, a second "Green" answer section 1204, and a third "Blue" answer section 1206. The first "Red" answer section 1202 includes a first answer field 1208, the second "Green" answer section 1204 includes a second answer field 1210, and the third "Blue" answer section 1206 includes a third answer field 1212. The first "Red" answer section 1202 further includes a first color display field 1214, the second "Green" answer section 1204 further includes a second color display field 1216, and the third "Blue" answer section further includes a third color display field 1218. The GUI 1200 further includes a result color field 1220. In FIG. 12A, each of the color fields are defaulted to display a black color because there are not yet any values entered into the answer fields 1208, 1210, and 1212. As values are entered into answer fields 1208, 1210, and 1212, the color display fields 1214, 1216, and 1218, as well as the result color field 1220, will update to display colors. This is done based on a Red, Green, Blue (RGB) additive color model, using values between 0 and 255 for each of the red, green, and blue color values. For example, as shown in FIG. 12B, if values of 255 are entered into each of the answer fields, the result color field 1220 is updated to display the color white. The color fields 1214, 1216, and 1218 would display a bright red, green, and blue color, respectively. The GUI 1200 further may include an instruction set 1222, detailing how to perform the Color Match activity. The GUI 1200 allows for students to perform math problems that result in values between and including 0 and 255, to enter the result they achieve for each of the math problems into the answer fields 1208, 1210, and 1212, and to have a color displayed in the result color field 1220 based on the students' answers. The result color field 1220 produces a resulting color by using each of the three numbers entered into the answer fields 1208, 1210, and 1212 as RGB color values. This enables instructors to teach and reinforce mathematics and the RGB color model, while also providing the students an interactive way to practice mathematics in order to increase student interest in the subject.

Figure 13:
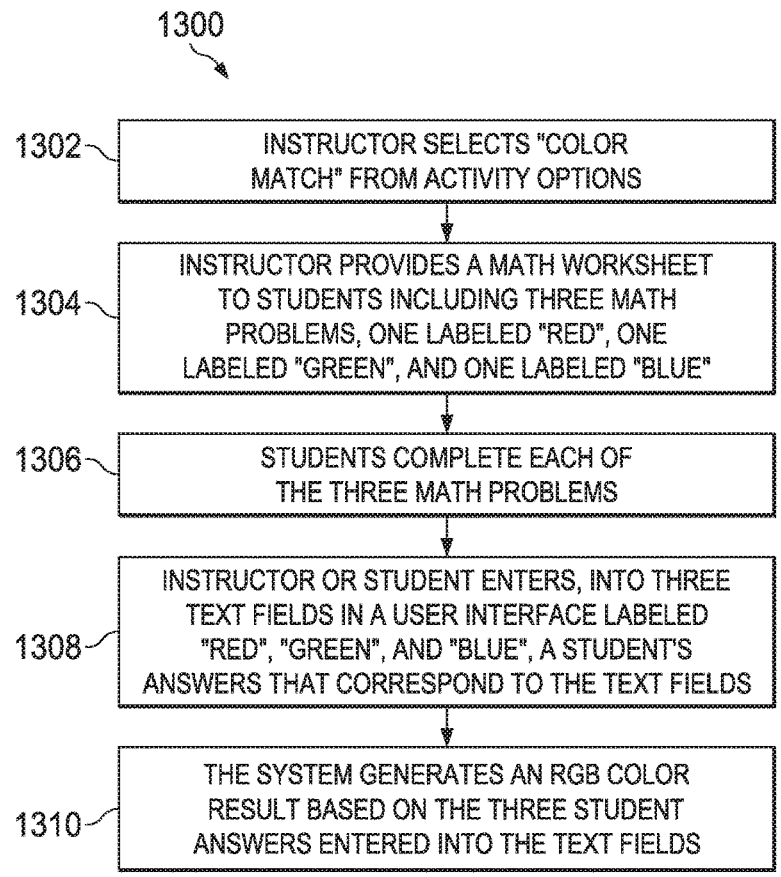
FIG. 13 illustrates a flow diagram of one embodiment of a Color Match activity method.

Referring now to FIG. 13, there is illustrated a flow diagram of one embodiment of a Color Match activity method 1300. At step 1302, the instructor selects "Color Match" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 1304, the instructor provides a math worksheet to students that includes at least three math problems for the students to solve, with the at least three math problems being labeled "Red," "Green," and "Blue." At step 1306, the students solve the math problems. At step 1308, the instructor or students enter answers for three math problems into three text fields in a GUI, each text field corresponding to one of red, green, or blue colors. The answers are entered by matching the color labeled on the text field to the math problem labeled with the same color. At step 1310, a system, such as a computing device equipped with a color monitor, generates an RGB color result based on the three student answers entered into the text fields. The method 1300 may be repeated any number of times to allow for students to continue practicing.

Referring now to FIG. 14, there is illustrated one embodiment of a Rhythmic Vocabulary activity GUI 1400. The GUI 1400 includes a plurality of exercises 1402. Each of the plurality of exercises 1402 includes a "Play" button 1404 and a "Stop" button 1406. Each one of the plurality of exercises 1402 further includes a sound title 1408. The "Play" button 1404 will cause a system, such as a computing device equipped with speakers, to play a series of beats that repeats, in accordance with the particular chosen one of the plurality of exercises 1402. The "Stop" button 1406 will cause the system to stop playing the particular chosen one of the plurality of exercises 1402. Each one of the plurality of exercises 1402, when played, may have different number of beats, with an accented beat on a particular beat. This is indicated in the sound title 1408, such as, for example, "4 Syllables, Accent #1," which means that the particular exercise plays four beats, with the accent on beat one. This enables students to say a particular vocabulary word aloud to the beat, with the particular exercise typically chosen based on the number of syllables in the vocabulary word, and with an accent on an appropriate syllable of the word. This serves to allow students to practice pronouncing the vocabulary word, as well as teaching how to place emphasis on particular syllables. The GUI 1400 may also include an instruction set 1410, which details how to perform the Rhythmic Vocabulary activity.

Figure 15:
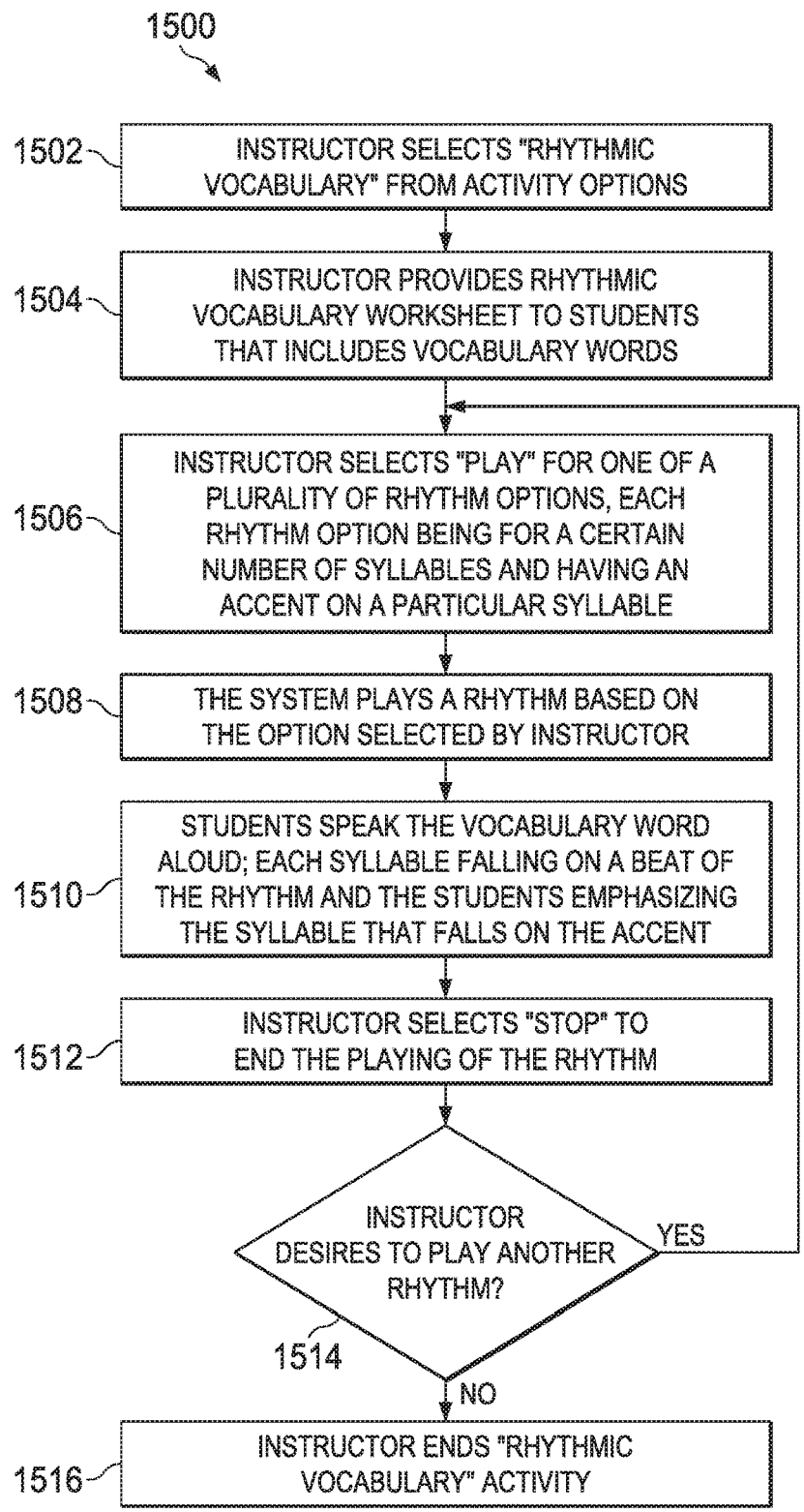
FIG. 15 illustrates a flow diagram of one embodiment of a Rhythmic Vocabulary activity method.

Referring now to FIG. 15, there is illustrated a flow diagram of one embodiment of a Rhythmic Vocabulary activity method 1500. At step 1502, the instructor selects "Rhythmic Vocabulary" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 1504, the instructor provides Rhythmic Vocabulary worksheets to students that include vocabulary words. At step 1506, the instructor selects "Play" for one of a plurality of rhythm exercises, each rhythm exercise being for a certain number of syllables in a word and having an accent on a particular syllable. At step 1508, a system, such as a computing device equipped with speakers, plays the selected rhythm exercise. At step 1510, the students speak each vocabulary word aloud, each syllable falling on a beat of the rhythm and the students emphasizing the syllable that falls on the accent. Thus, if the first vocabulary word on the vocabulary worksheet is "Vocabulary," the instructor may choose a rhythm exercise with 5 beats and an accent on the second beat. Thus, the students would say "Vo-ca-bu-la-ry," each syllable on each beat, with an accent on "ca." The students may also take turns saying each syllable. For instance, the students may sit in a circle, or even a drum circle, and go around the circle having each student saying one syllable of the word aloud. In addition, entire sentences, essays, or poems, for example, could also be read, either with each syllable on beats, or even with rhythms in order to develop rhythmic flow of the sentence, essays, or poems. At step 1512, the instructor selects "Stop" to end the playing of the rhythm. At decision block 1514, the instructor decides whether to play another rhythm exercise. If the instructor decides to do so, the process moves back to step 1506. If the instructor decides not to do so, the process moves to step 1516. At step 1516, the instructor ends the Rhythmic Vocabulary activity. The Rhythmic Vocabulary tool is designed to internalize the use of syllabic breakdowns and to build articulation, diction, melody, volume, and inflection through pronunciation exercises.

Figure 16:
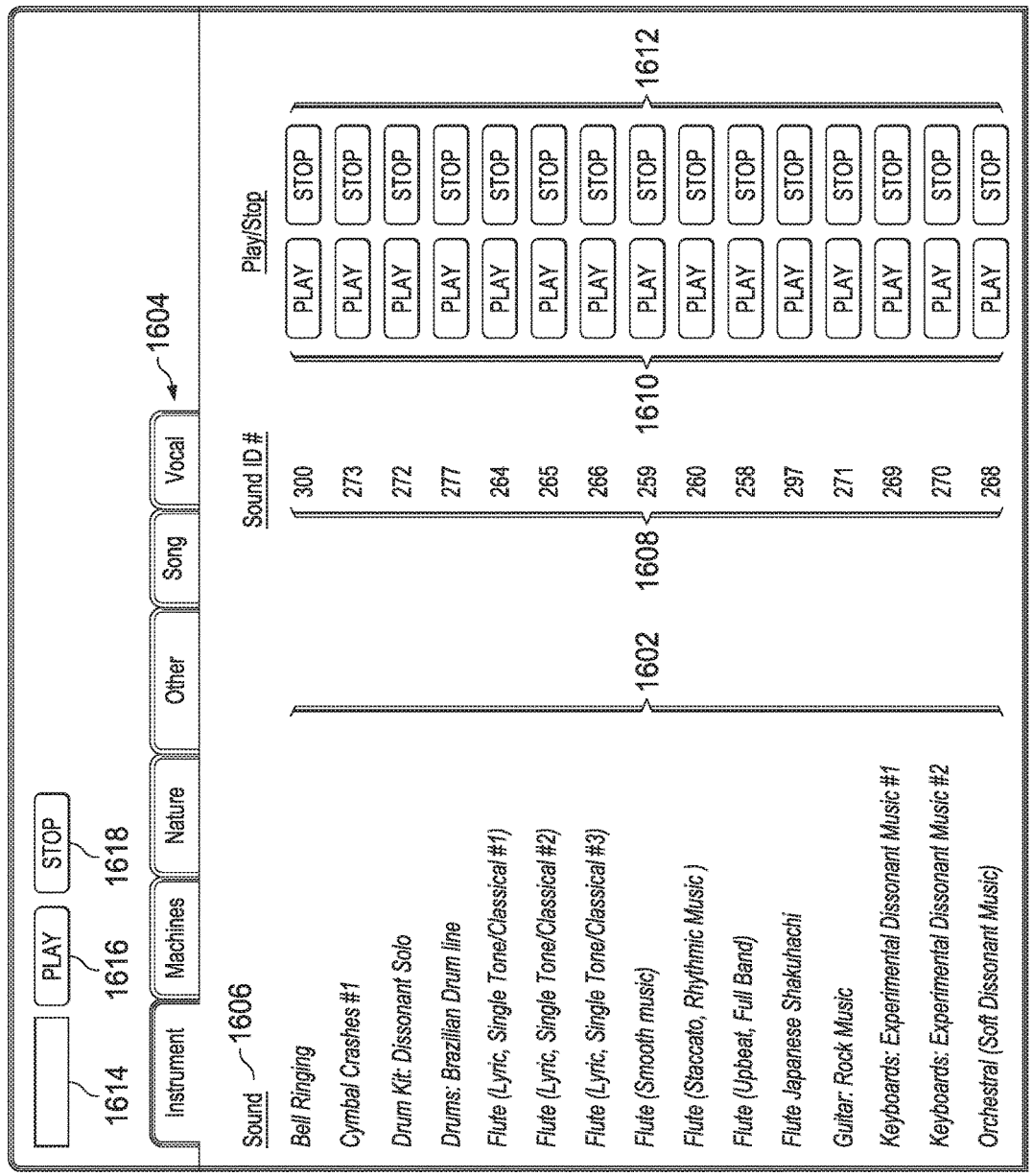
FIG. 16 illustrates one embodiment of a Storybook activity GUI.

Referring now to FIG. 16, there is illustrated one embodiment of a Storybook activity GUI 1600. The GUI 1600 includes a plurality of sound selections 1602 that may be divided into a plurality of categories 1604. The plurality of categories 1604 may include categories such as "instrument," "machines," "nature," "song," "vocal," or other categories. Each of the plurality of sound selections may have a sound title 1606, a sound ID number 1608, a "Play" button 1610, and a "Stop" button 1612. The "Play" button 1610 causes a system, such as a computing device equipped with speakers, to play the particular one of the plurality of sound selections 1602 that the particular "Play" button 1610 is associated with. Similarly, the "Stop" button 1612 stops playback of the particular one of the plurality of sound selections 1602 that the particular "Stop" button 1612 is associated with. The GUI 1600 may further include a sound ID number entry field 1614. The sound ID number entry field 1614 allows a user to enter the sound ID number 1608 for a particular one of the plurality of sound selections 1602. The GUI 1600 may further include a sound ID number entry field "Play" button 1616 and a sound ID number entry field "Stop" button 1618. Selecting the sound ID number entry field "Play" button 1616 causes the system to play the particular one of the plurality of sound selections 1602 that is associated with the sound ID number 1608 that was previously entered into the sound ID number entry field 1614. Similarly, selecting the sound ID number entry field "Stop" button 1618 causes the system to cease playback of the particular one of the plurality of sound selections 1602 that is associated with the sound ID number 1608 that was previously entered into the sound ID number entry field 1614.

The Storybook activity allows for instructors and students to use sound effects in accompanying stories as the stories are read aloud. For instance, if a student writes a short story, the student may then consult the plurality of sound selections 1602 in order to choose sound selections to play alongside a reading of the short story. The student may write sound ID numbers underneath particular words in the short story. For example, if the short story referenced a bell ringing, the student may write "300" underneath the word "bell" in the short story. As shown in FIG. 16, sound ID "300" refers to a "Bell Ringing" sound. The student could do such numerous times throughout the text of the short story. Then, upon a reading of the short story, the student who wrote the story, another student, or the instructor would utilize the Storybook GUI 1600 to play the sounds. As the reader of the short story encountered each word with a sound ID number underneath it, the person utilizing the GUI 1600 would play the sound selection associated with the sound ID number. This same process could be used for other student-created works, such as poems, essays, reports, plays, scripts, haiku, or other works. The tool helps students to learn articulation, diction, melody, volume, and inflection through pronunciation exercises.

The Storybook GUI 1600 may also be used for other activities, such as a "Levels of Music" activity. Such an activity would allow sounds or music to be played while students are attempting to perform other tasks, in order to determine what types of sounds can help students focus, and what types of sounds are distracting.

Figure 17:
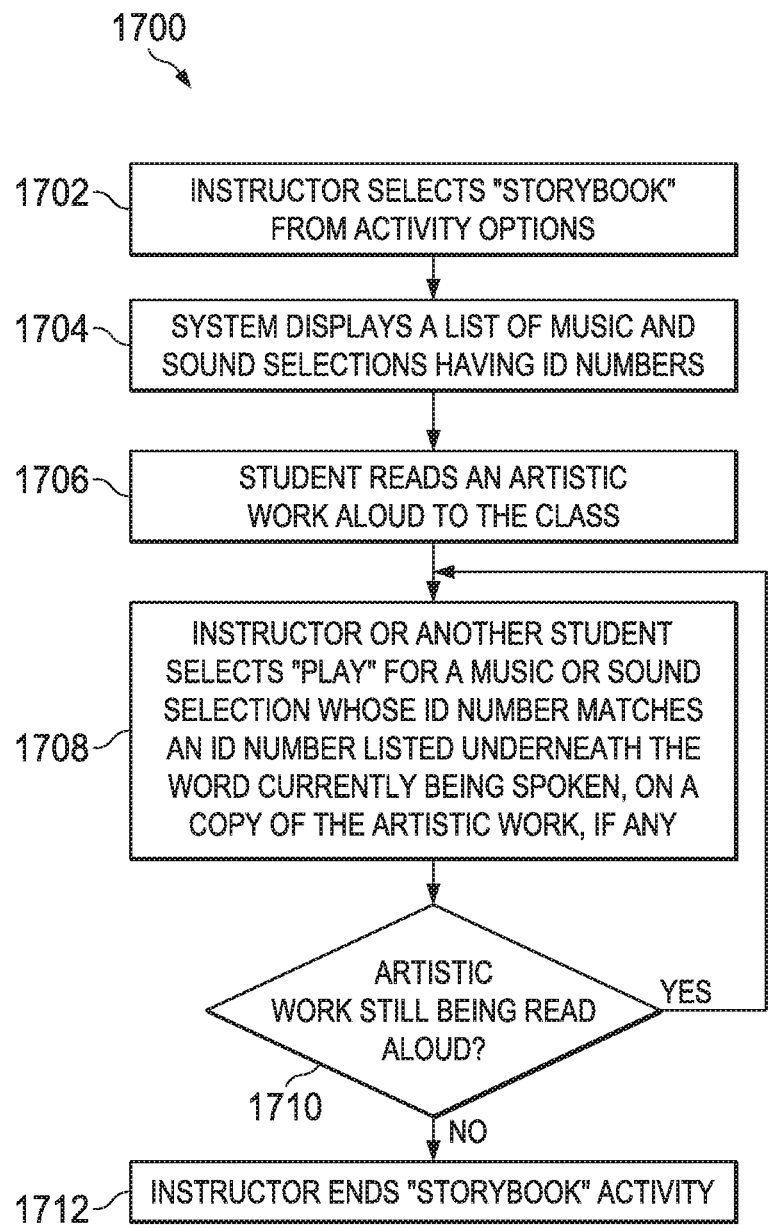
FIG. 17 illustrates a flow diagram of one embodiment of a Storybook activity method.

Referring now to FIG. 17, there is illustrated a flow diagram of one embodiment of a Storybook activity method 1700. At step 1702, the instructor selects "Storybook" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 1704, a system, such as a computing device equipped with speakers and a monitor, displays a list of music or sound selections having ID numbers. At step 1706, a student begins reading an artistic work aloud to the class. At step 1708, the instructor or another student selects "Play" for a music or sound selection whose ID number matches an ID number listed underneath the word currently being spoken by the reader on a copy of the artistic work being read aloud. At decision block 1710, it is determined if the artistic work is still being read aloud. If so, the process moves back to step 1708 for the current word being spoken aloud. If not, the process moves to step 1712 where the instructor ends the Storybook activity.

Referring now to FIG. 18, there is illustrated one embodiment of a Song Creation activity GUI 1800. The Song Creation activity allows for instructors and students to upload created and recorded songs to be stored in a plurality of song selections 1802. Once uploaded, the GUI 1800 displays the song within the plurality of song selections 1802. Each one of the song selections 1802 may include a song selection number 1804, a "Play" button 1806, a "Stop" button 1808, and a song title 1810. The "Play" button 1806, when selected, causes a system, such as a computing device equipped with speakers, to play the particular one of the plurality of song selections 1802 associated with the "Play" button 1806 selected. Similarly, the "Stop" button 1808 ceases playback of the particular one of the plurality of song selections 1802 associated with the "Stop" button 1808 selected. The plurality of song selections 1802 may also be used in other activities, such as the Storybook activity described hereinabove.

Figure 19:
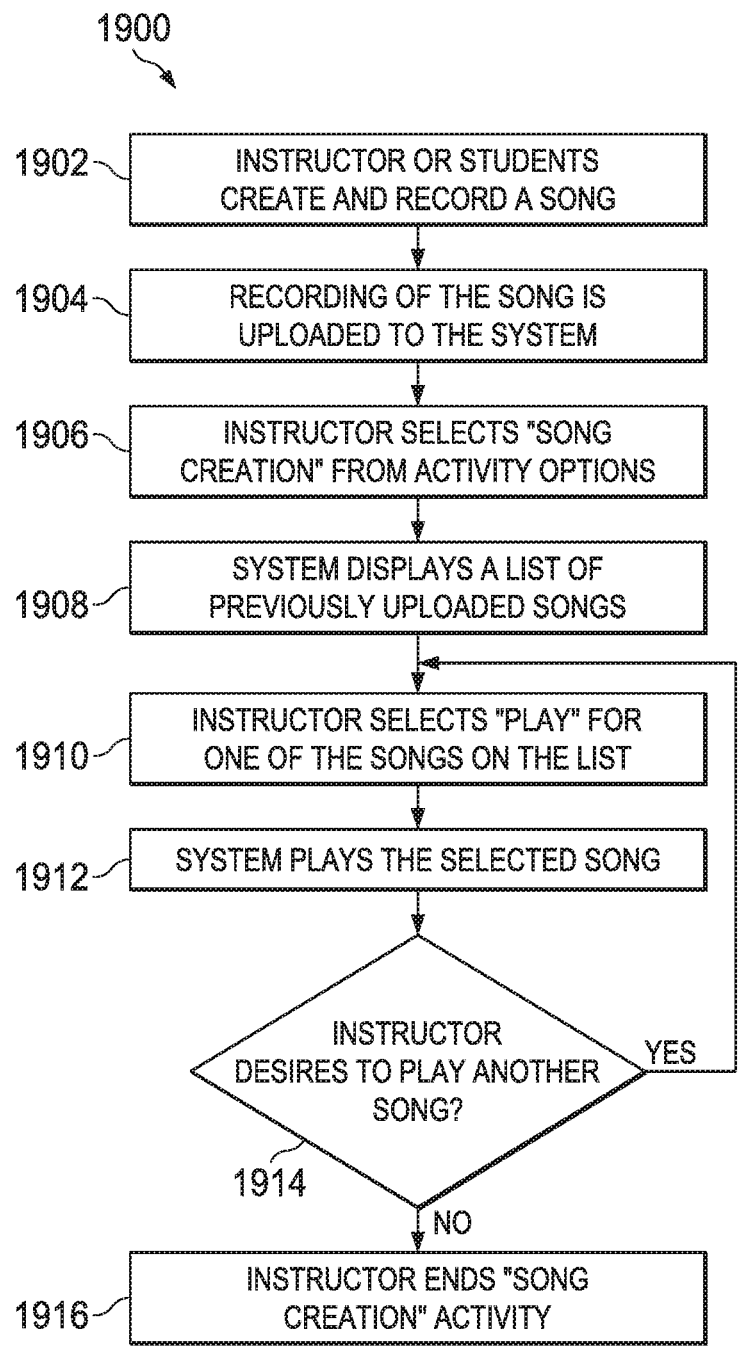
FIG. 19 illustrates a flow diagram of one embodiment of a Song Creation activity method.

Referring now to FIG. 19, there is illustrated a flow diagram of one embodiment of a Song Creation activity method 1900. At step 1902, instructors or students create and record a song. At step 1904, a recording of a song is uploaded to a system, where the system may be a computing device equipped with speakers. The song may additionally be stored on the server 102. At step 1906, the instructor selects "Song Creation" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 1908, the system displays a list of previously uploaded songs. At step 1910, the instructor selects "Play" for one of the songs on the list. At step 1912 the system plays the selected song. At decision block 1914, the instructor decides whether to play another song. If so, the process moves back to step 1910. If not, the process moves to step 1916 where the instructor ends the Song Creation activity.

Referring now to FIGS. 20A-20H, there are illustrated embodiments of a Designer activity GUI 2000. The GUI 2000 includes a design grid 2002. The design grid 2002 allows shapes to be drawn on the grid, using predetermined shapes, or shapes created by a user. The GUI 2000 further includes a design menu 2004. The design menu 2004 includes an angle tool 2006, a color palette tool 2008, a shapes tool 2010, a border tool 2012, a rectangle tool 2014, a circle tool 2016, a line tool 2018, a text tool 2020, a move-object-up tool 2022, a move-object-down tool 2024, and a toggle grid tool 2026. The GUI 2000 may also include a key 2028, the key 2028 detailing what tasks each of the design menu 2004 options perform. The GUI 2000 may also include a design name field 2030 having an associated design update button 2032. This allows the user to name a particular created design by typing the design name into the design name field 2030 and clicking the design update button 2032 to save the design. Saved designs are stored in a design catalog 2034. The design catalog 2034 may include a plurality of saved designs. Each one of the plurality of saved designs may be updated or removed from the design catalog 2034.

Figure 20A:
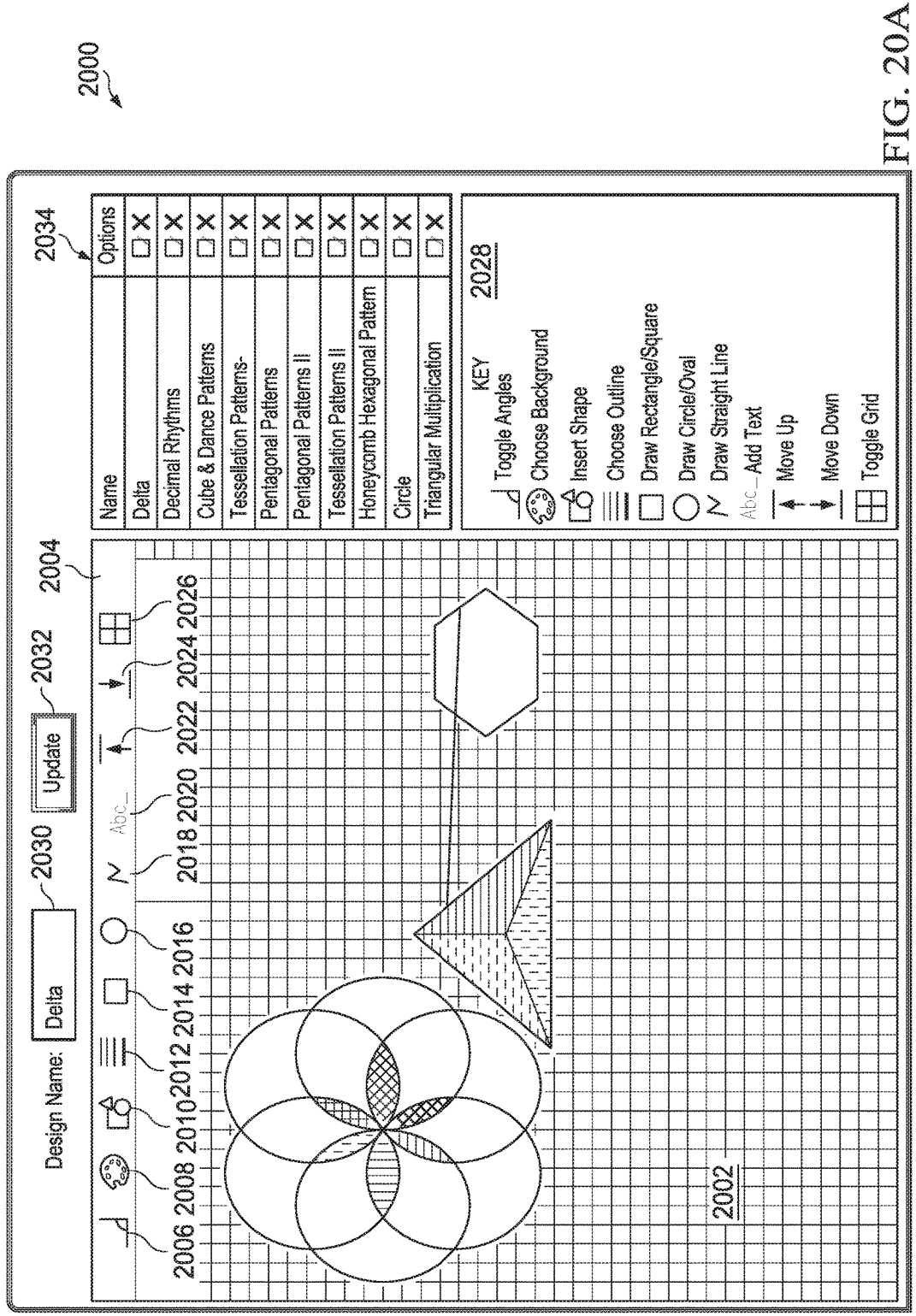
FIG. 20A illustrates one embodiment of a Designer activity GUI.
Figure 20B:
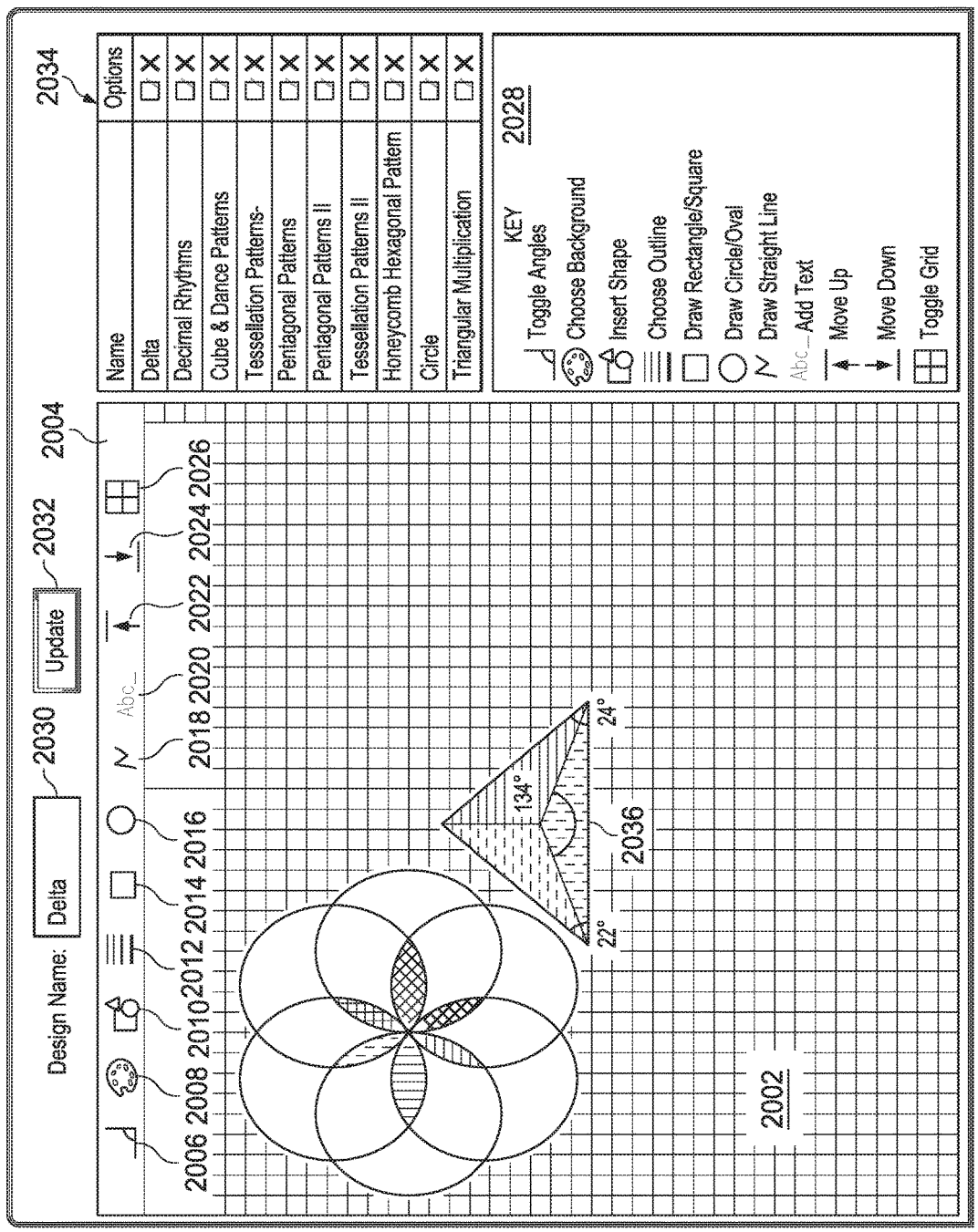
FIG. 20B illustrates one embodiment of a Designer activity GUI.
Figure 20C:
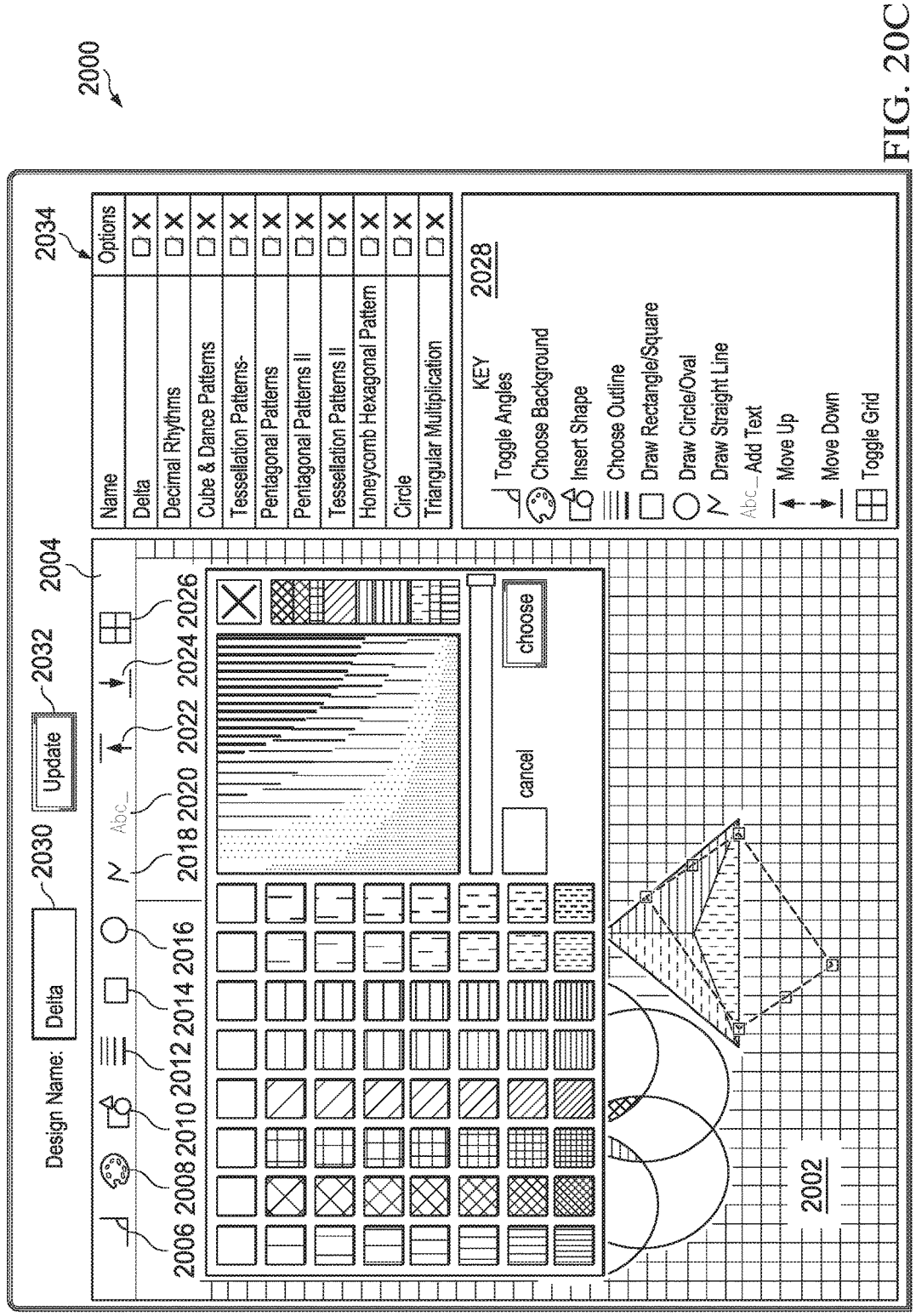
FIG. 20C illustrates one embodiment of a Designer activity GUI.
Figure 20D:
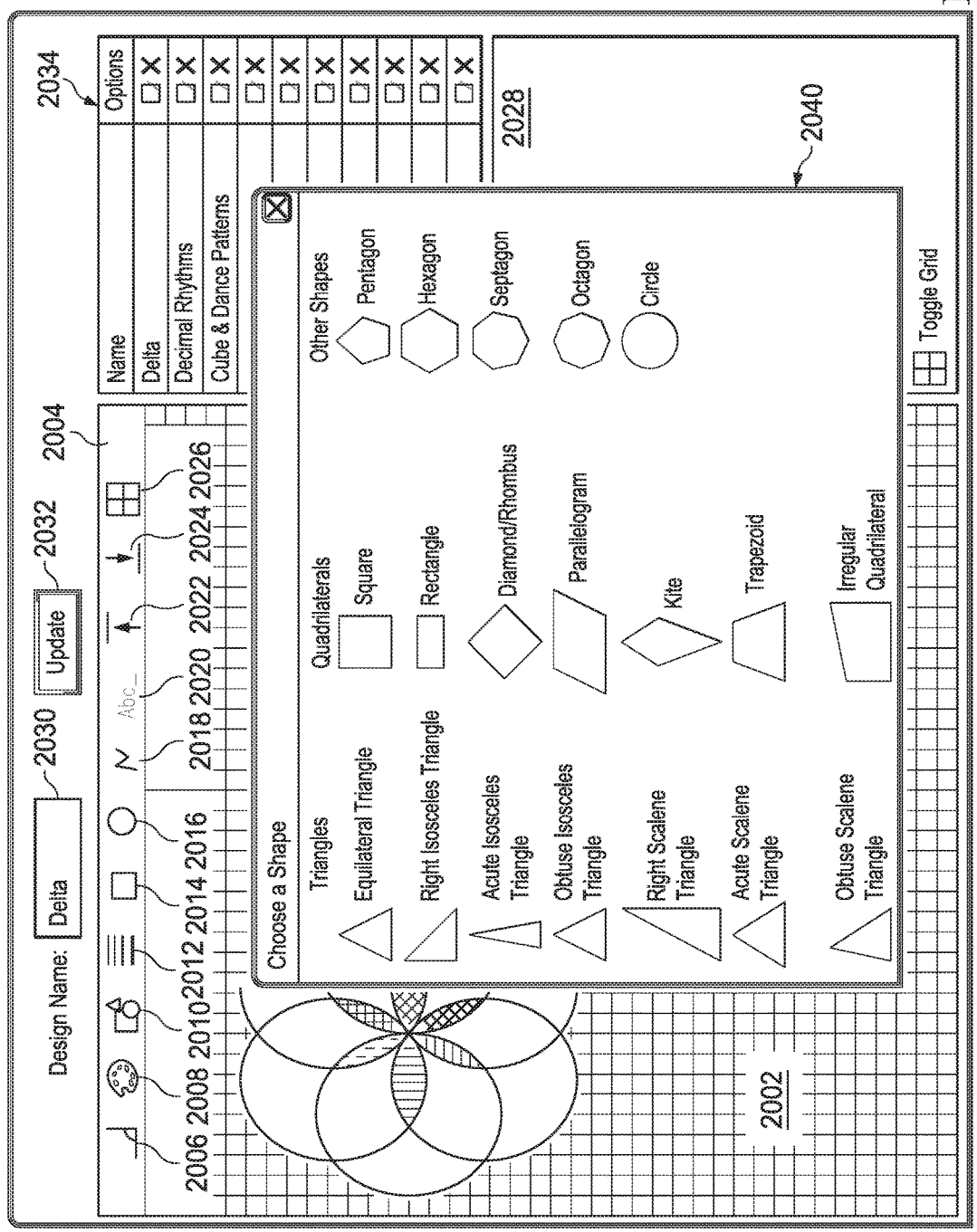
FIG. 20D illustrates one embodiment of a Designer activity GUI.
Figure 20E:
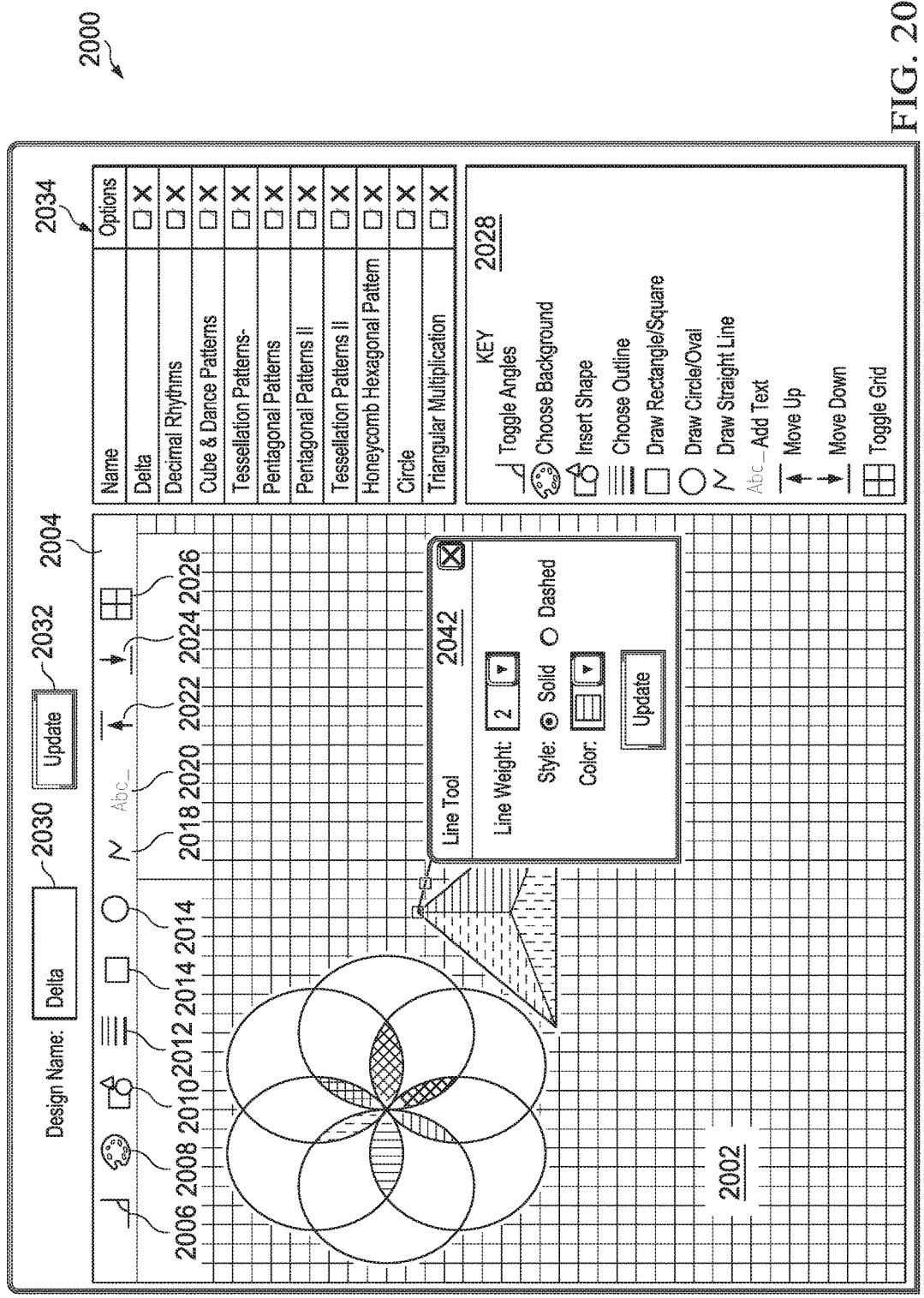
FIG. 20E illustrates one embodiment of a Designer activity GUI.
Figure 20F:
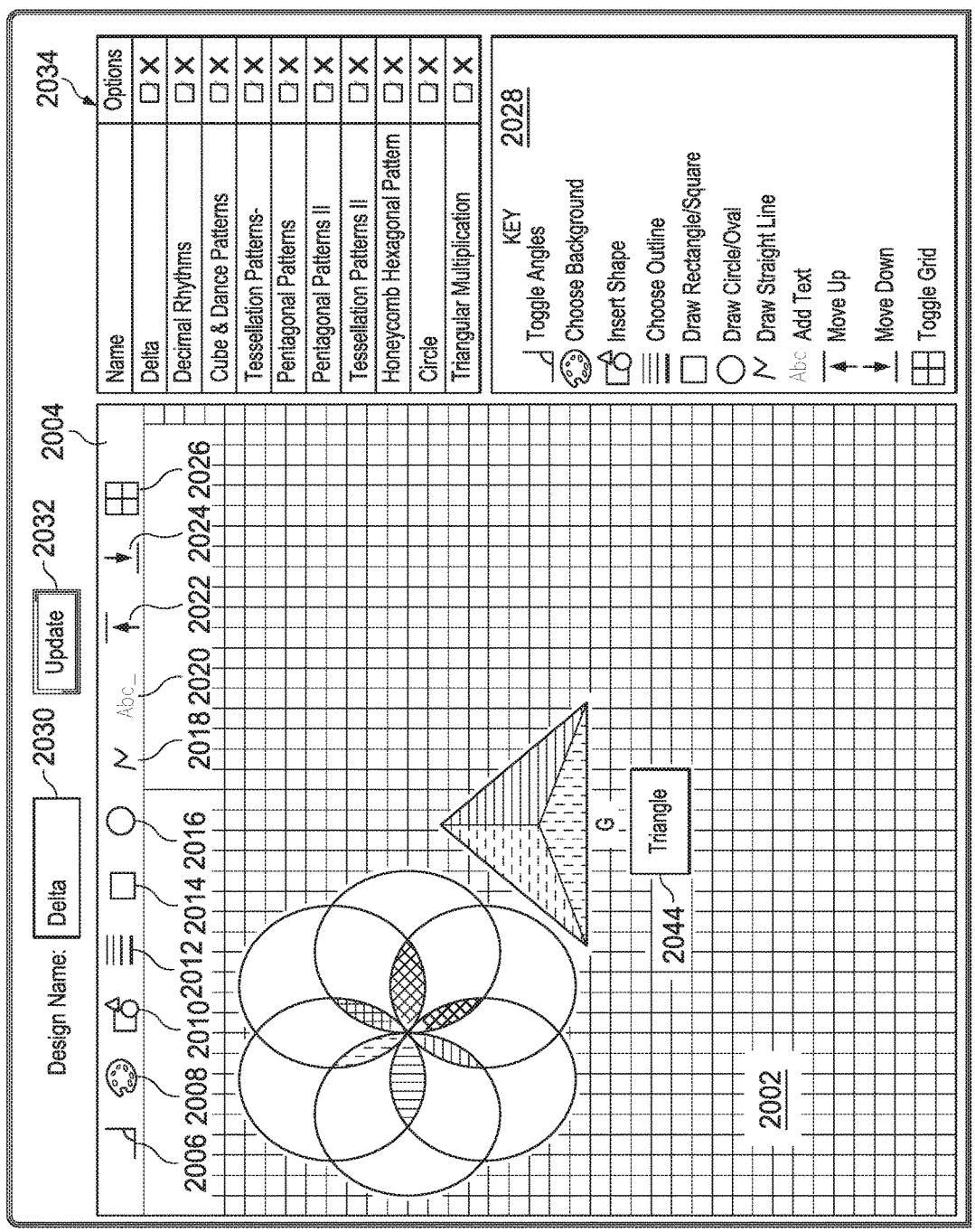
FIG. 20F illustrates one embodiment of a Designer activity GUI.

The angle tool 2006 allows a user to toggle the display of angles for a particular shape. For instance, FIG. 20B shows a triangle 2036 where the angle tool 2006 was used to display the angles of the triangle 2036. It is shown that the triangle 2036 has angles of 22°, 24°, and 134°. The color palette tool 2008 allows a user to change the color of shapes by bringing up a color palette 2038, as shown in FIG. 20C. The shapes tool 2010 allows a user to choose, from a predetermined list of shapes 2040, a shape to insert into the design grid 2002, as shown in FIG. 20D. The border tool 2012 allows a user to format the borders of shapes by changing line width, line style, such as solid or dashed, line color, or other properties, by bringing up a border tool window 2042, as shown in FIG. 20E. The rectangle tool 2014 allows a user to easily insert a rectangle of various dimensions into the design grid 2002. The circle tool 2016 allows a user to easily insert a circle of various sizes into the design grid 2002. The line tool 2018 allows a user to easily insert a line or a series of lines into the design grid 2002. The text tool 2020 allows a user to insert a text box, as demonstrated by the text box 2044 shown in FIG. 20F. The move-object-up tool 2020 allows a user to bring an object to the front when objects are stacked. The move-object-down tool 2022 allows a user to move an object back behind other objects when objects are stacked. The toggle grid tool 2026 allows a user to toggle grid lines shown on the design grid 2002 to instead show a white space. The GUI 2000 may also have an instruction set 2046 that details how to perform the Designer activity.

Figure 20H:
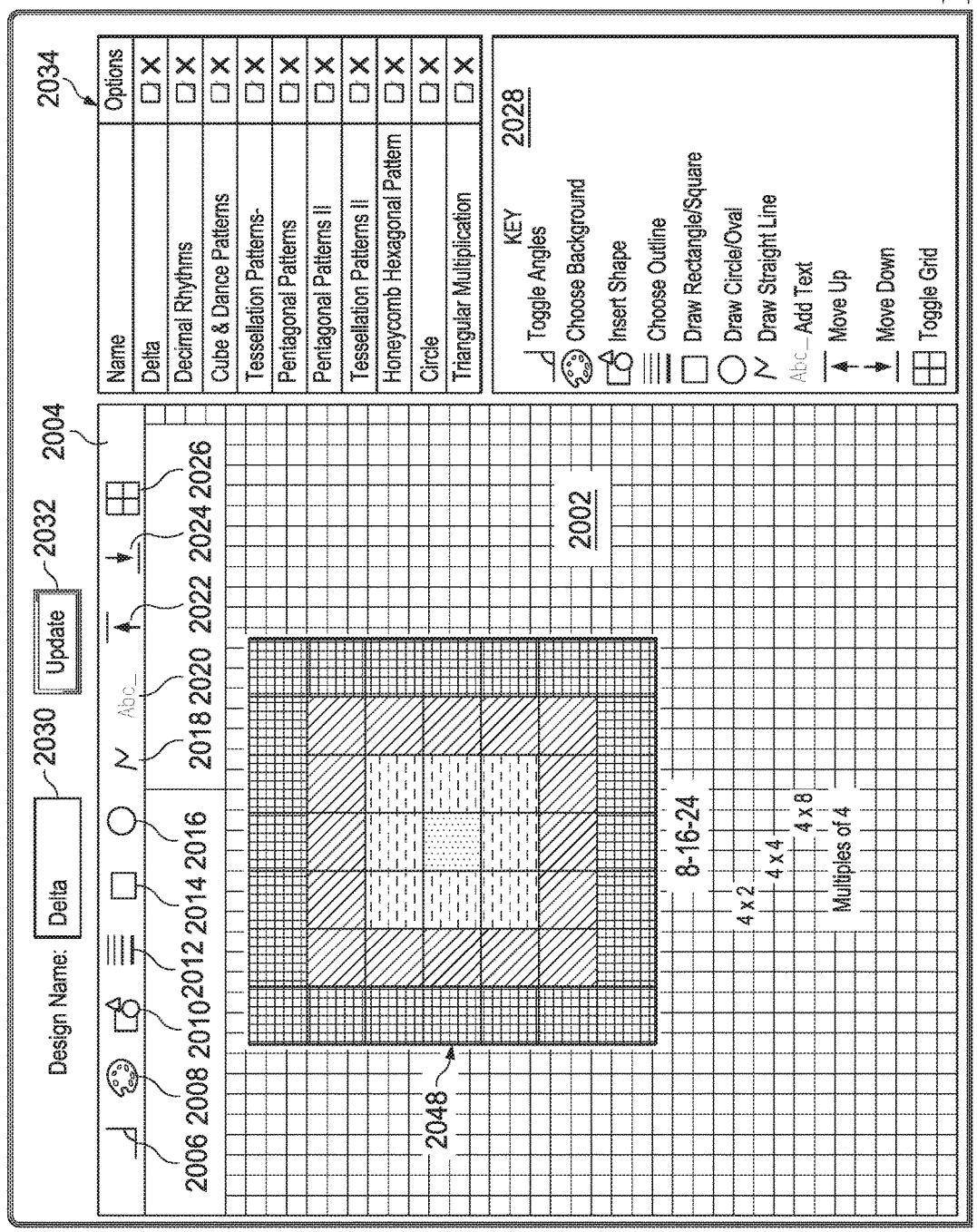
FIG. 20H illustrates one embodiment of a Designer activity GUI.

Referring specifically to FIG. 20H, there is demonstrated how the Designer GUI 2000 can reinforce certain mathematical concepts. For example, there is shown a square shape 2048, the square shape being made up of smaller separate squares. The square shape 2048 demonstrates multiples of 4, with each layer of the square shape 2048 consisting of smaller squares equaling multiples of 4, such as 8, 16, and 24. This is but one example of how instructors may use this tool to teach or reinforce core concepts while also allowing students to be creative. The Designer activity can build understanding of many concepts such as tessellation, subdivision, symmetry, asymmetry, fractions, multiplication, use of shapes with specific degrees, patterns & sequence, inversions, scale, negative space, and balance.

Figure 21:
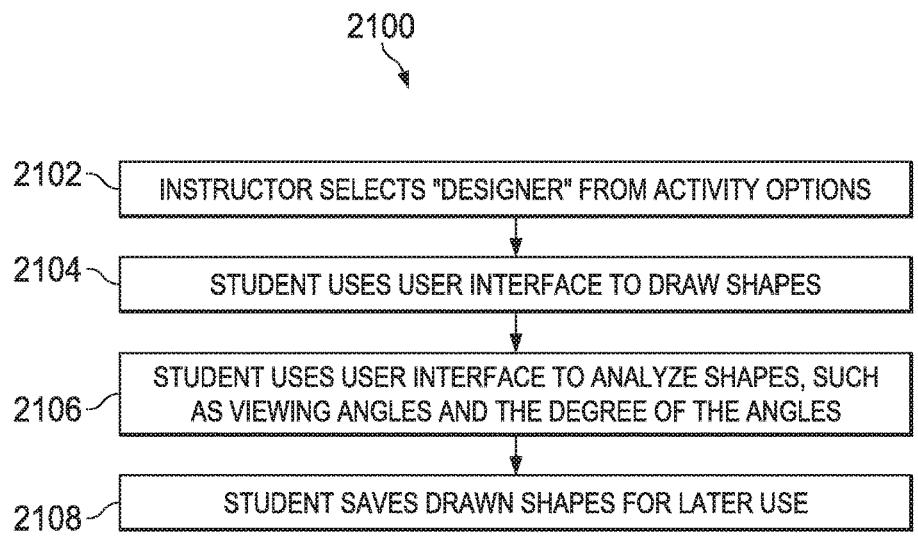
FIG. 21 illustrates a flow diagram of one embodiment of a Designer activity method.

Referring now to FIG. 21, there is illustrated a flow diagram of one embodiment of a Designer activity method 2100. At step 2102, the instructor selects "Designer" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 2104, students use the user interface provided for the Designer activity to draw shapes. At step 2106, students use the user interface to analyze the shapes they previously drew, such as viewing angles and the degree of the angles of the shapes. At step 2108, the students save the drawn shapes for later use by selecting a save option.

Figure 22:
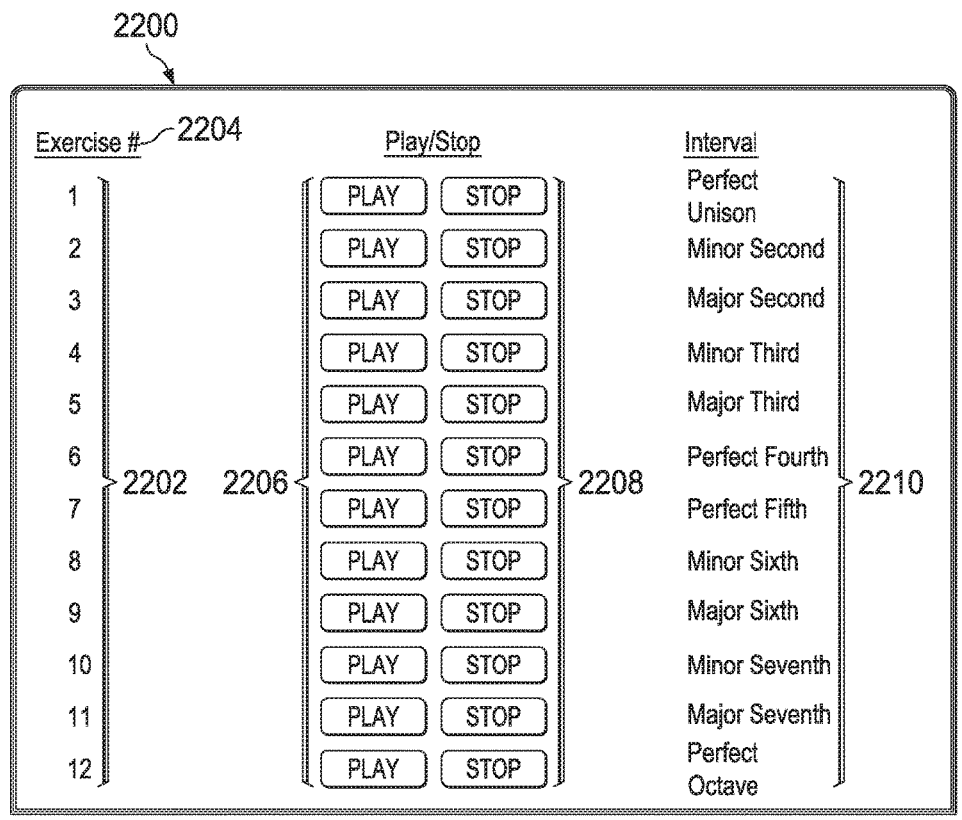
FIG. 22 illustrates one embodiment of an Intervals activity GUI.

Referring now to FIG. 22, there is illustrated an Intervals activity GUI 2200. The Intervals activity allows for instructors to test whether students can recognize certain musical intervals by listening to the interval. The GUI 2200 displays the interval within a plurality of interval selections 2202. Each one of the interval selections 2202 may include an interval selection number 2204, a "Play" button 2206, a "Stop" button 2208, and an interval title 2210. The intervals listed may be those listed in FIG. 22, such as minor, major, and perfect intervals, or may be more advanced intervals such as augmented or diminished intervals. The "Play" button 2206, when selected, causes a system, such as a computing device equipped with speakers, to play the particular one of the plurality of interval selections 2202 associated with the selected "Play" button 2206. Similarly, the "Stop" button 2208 ceases playback of the particular one of the plurality of interval selections 2202 associated with the "Stop" button 2208 selected. The plurality of interval selections 2202 may also be used in other activities, such as the Storybook activity described hereinabove.

Figure 23:
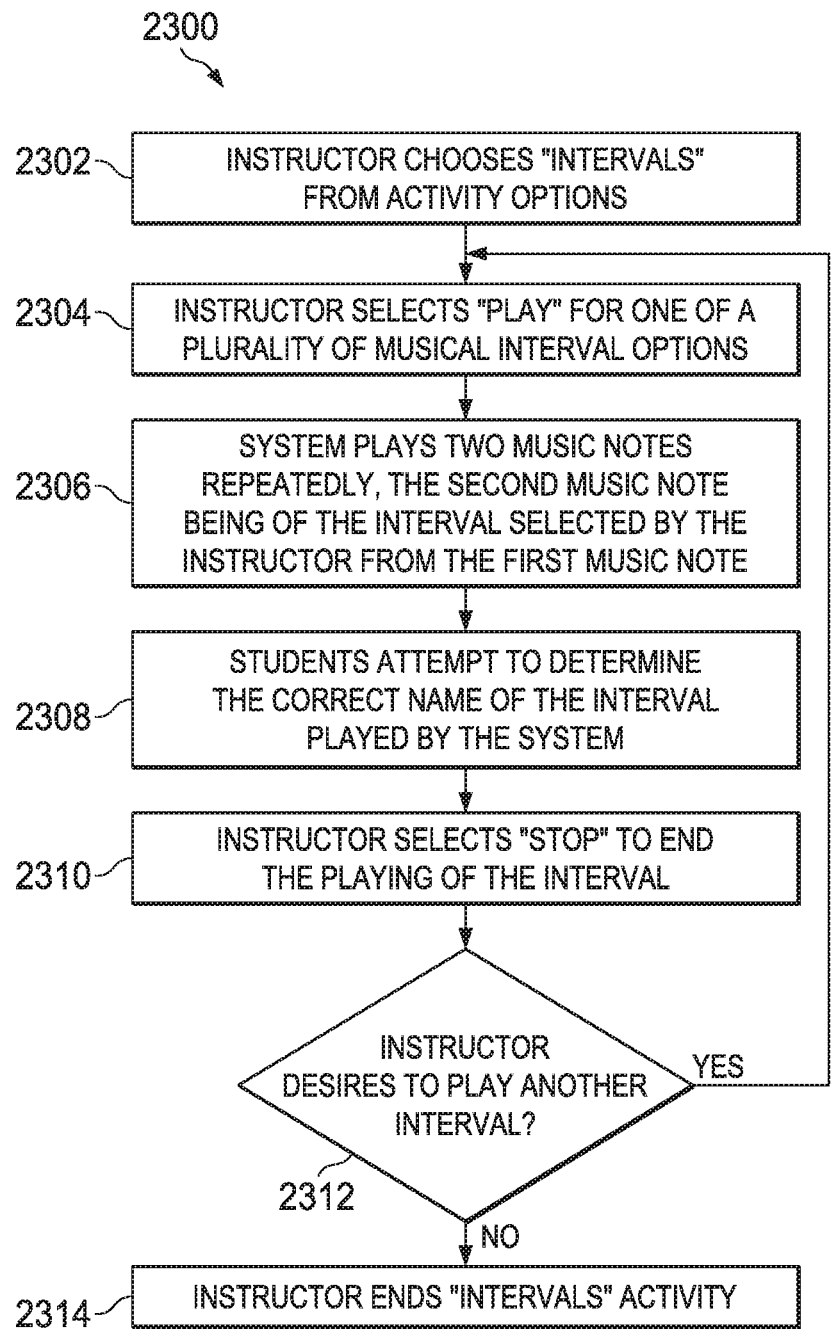
FIG. 23 illustrates a flow diagram of one embodiment of an Intervals activity method.

Referring now to FIG. 23, there is illustrated a flow diagram of one embodiment of an Intervals activity method 2300. At step 2302, the instructor selects "Intervals" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 2304, the instructor selects "Play" for one of a plurality of musical interval options. At step 2306, the system plays the selected musical interval selection by playing two music notes repeatedly, the second music note being of the interval selected by the instructor from the first music note. At step 2308, students attempt to determine the correct name of the interval played by the system. At step 2310, the instructor selects "Stop" to end the playing of the interval. At decision block 2312, the instructor decides whether to play another interval or not. If the instructor decides to play another interval, the process moves back to step 2304. If the instructor decides not to play another interval, the process moves to step 2314 where the instructor ends the Intervals activity.

Figure 24:
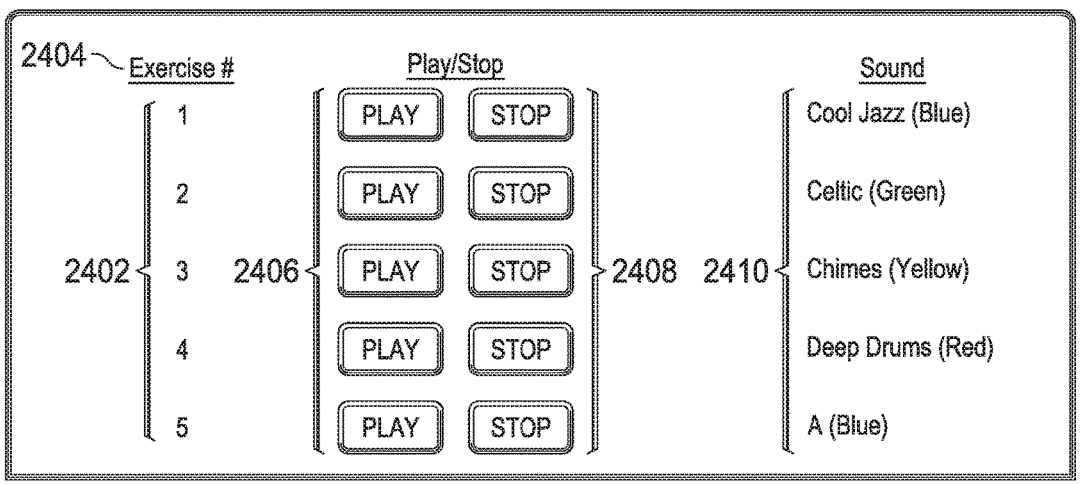
FIG. 24 illustrates one embodiment of a The Color of Tone activity GUI.

Referring now to FIG. 24, there is illustrated a "The Color of Tone" activity GUI 2400. As the brain becomes less pliable (from age 7-12, depending on the particular theory), one's ability to be creative and imaginative becomes challenged. The Color of Tone activity allows a student to stay a little more pliable and abstract in thought to build on individual ideas. By listening to a sound, the student identifies a color based on what they imagine. The GUI 2400 displays a plurality of sound selections 2402. Each one of the sound selections 2402 may include an sound selection number 2404, a "Play" button 2406, a "Stop" button 2408, and a sound title 2410. The sounds listed may be full musical works or excerpts, or may simply be one particular musical note. The "Play" button 2406, when selected, causes a system, such as a computing device equipped with speakers, to play the particular one of the plurality of sound selections 2402 associated with the selected "Play" button 2406. Similarly, the "Stop" button 2408 ceases playback of the particular one of the plurality of sound selections 2402 associated with the "Stop" button 2408 selected. The plurality of sound selections 2402 may also be used in other activities, such as the Storybook activity described hereinabove.

Figure 25:
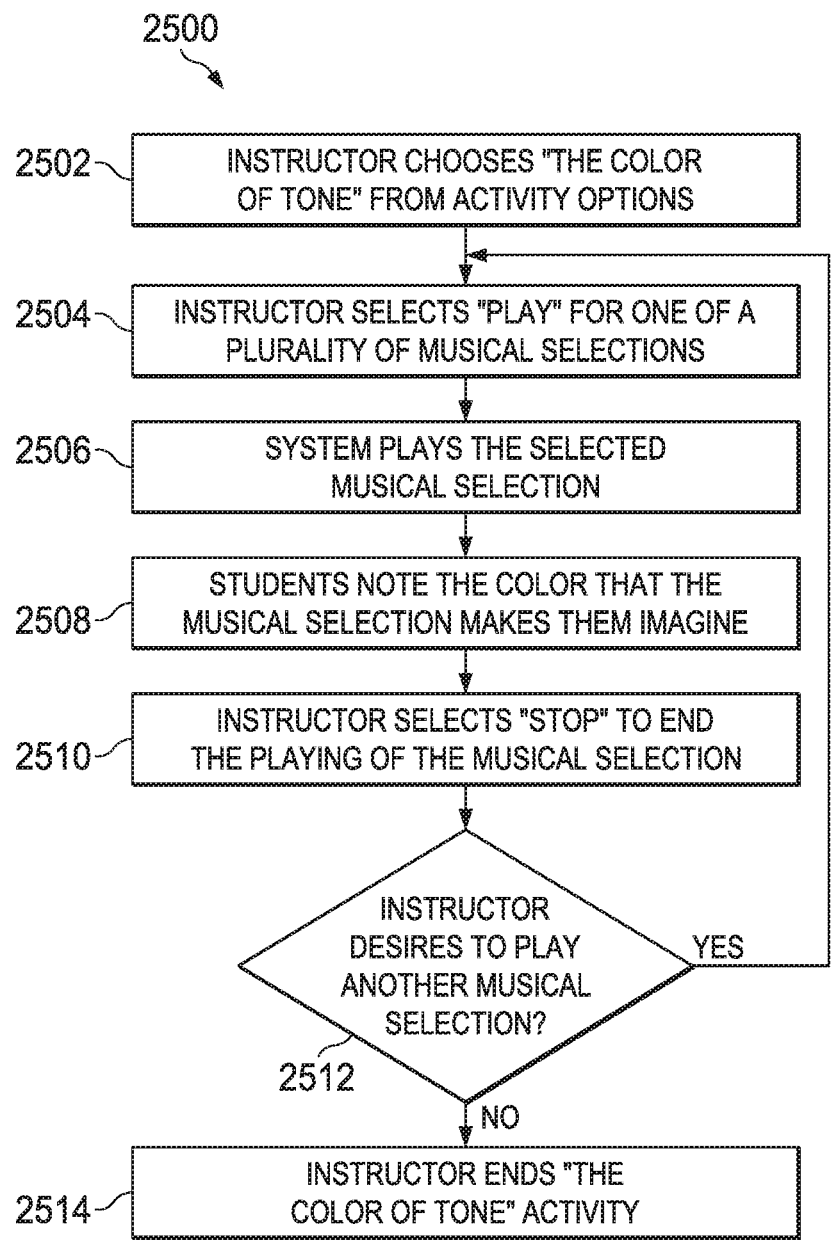
FIG. 25 illustrates a flow diagram of one embodiment of a The Color of Tone activity method.

Referring now to FIG. 25, there is illustrated a flow diagram of one embodiment of a "The Color of Tone" activity method 2500. At step 2502, the instructor selects "The Color of Tone" from a list of activity options. Such options may be presented in the activities menu 200 shown on the activities website 106, or it may be in a personal list of activities in the possession of the instructor. Of course, practically, the instructor may simply choose to have the students participate in the activity, without consulting a list of activity options. At step 2504, the instructor selects "Play" for one of a plurality of musical selections. At step 2506, the system plays the selected musical selection. At step 2508, students note the color that the musical selection makes them imagine. At step 2510, the instructor selects "Stop" to end the playing of the musical selection. At decision block 2512, the instructor decides whether to play another musical selection or not. If the instructor decides to play another musical selection, the process moves back to step 2504. If the instructor decides not to play another musical selection, the process moves to step 2514 where the instructor ends The Color of Tone activity.

In addition the activities described hereinabove, there may also be included, such as part of the activities website 106, a progress evaluation option. This would display tangible metrics for students and students' improvement. It could also allow students to record work they have done, such as allowing a student to record him or herself speaking a vocabulary word. The student could then revisit the recording later to determine if his or her pronunciation of the word has improved. Each student may have a separate IP address in order to maintain privacy. Also, artistic creations from particular activities, such as creations used in the Storybook or Song Creation activities, could be sold for school fundraisers. In addition, audio files created using activities such as Song Creation, or stock audio files, may be used by certain school faculty members in their work with the students, such as speech therapy instructors or music teachers.

Figure 26:
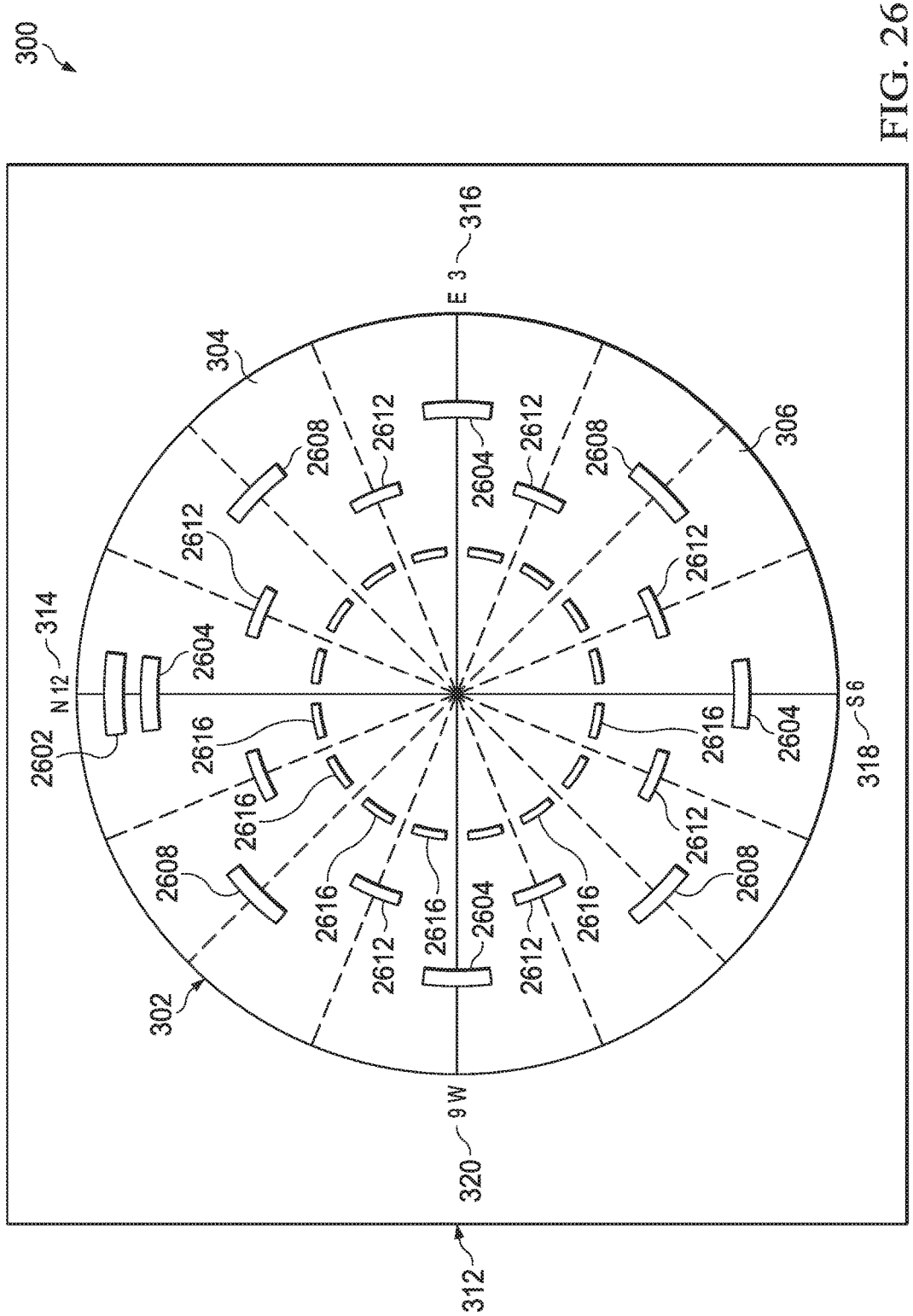
FIG. 26 illustrates a diagrammatic view of an alternate embodiment for electronically recognizing the presence of an completely sized tile within its associated sector.

Referring now to FIG. 26, there is illustrated a top view of the embodiment of FIG. 3A, with the addition of contact points for each potential sector. As noted hereinabove, a whole note could be disposed within the entire circle covering all four quadrants, a half note could be provided covering any two quadrants, a quarter note could be contained within any quadrant, a ⅛ note could be disposed within any half of a quadrant and a ¹/₁₆ note could be disposed in any quarter of a quadrant. To facilitate this, there will be provided a system for discriminating which note is disposed within the respective quadrants. There will be provided a first contact 2602 that will be disposed at the uppermost northern side of the overall tool that will span the upper two quadrants. This will be on an outer peripheral circle. At the boundary of each two adjacent quadrant, there will be provided a contact 2604 that will be associated with any half note tile. There are four of these contacts for the reason that a half note tile could cover any two adjacent quadrants. There will be provided at the center of each quadrant a contact 2608 at a closer peripheral circle than the contact 2604 and the contact 2602 for each associated quarter note tile in each associated quadrant. At a closer peripheral circle, there will be provided eight ⅛th note contacts 2612 that are associated with ⅛th note tiles. There will be provided at a closer peripheral circle sixteen contacts 2616 for association with the ⅛$^{th}$ note tiles. There is also provided a center contact 2620 for providing a ground contact.

Figure 27:
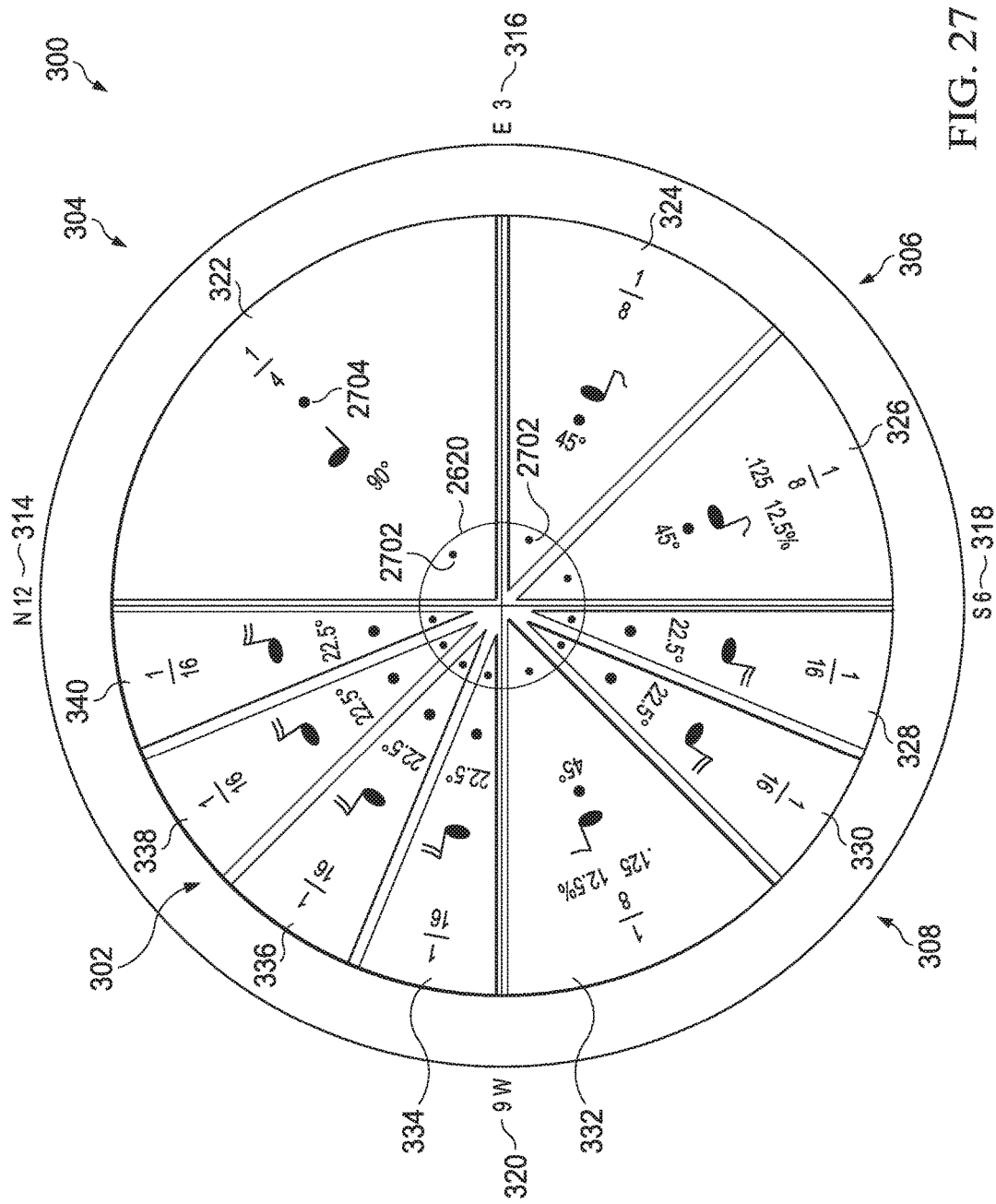
FIG. 27 illustrates a top view of tiles dispose within their appropriate sectors and the associated contact points.

Referring now to FIG. 27, there is illustrated a diagrammatic view of the embodiment of FIG. 3D illustrating each tile having a ground contact 2702 and a primary contact 2704. Each of the primary contacts 2704 are disposed in such a manner to contact the associated contact described above with respect to FIG. 26. The whole note and half note are not illustrated, but their primary contact 2704 will be disposed, with respect to the full load on the upper northern side which will be oriented with the note and text on the tile such that the upper "North" side can be located and correctly oriented and, with respect to the half tile, the primary contact 2704 will be disposed on the edge at the distal end thereof.

It can be seen that, for tiles illustrated in FIG. 27, that the primary contacts 2704 are disposed in the center of the tile and dispose from the edges thereof by the distance at the contacts are disposed from the edge of the circle along their associated peripheral circle. These contacts will be dimensioned with a length that accommodates a slight misalignment of a tile and also a width to calculate any tolerance for radial movement. Thus, when each tile is disposed within the tool, the primary contact 2704 will contact the appropriate underlying contact and the ground contact 2702 will contact the ground contact 2620.

Figure 28A:
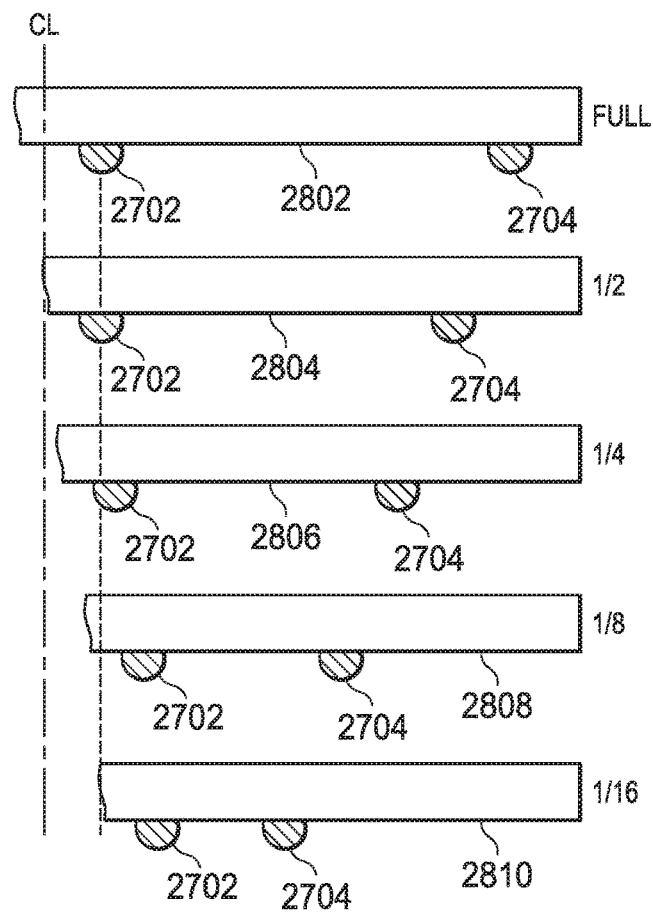
FIGS. 28A-28C illustrate cross-sectional views of various sized tiles for the various size notes.

Referring now to FIG. 28A, there are illustrated side views of each of the tiles. It can be seen that, for the whole note tile, indicated by a tile 2802, that there is provided the ground contact 2702 proximate the centerline of the overall tool and the primary contact 2704 at the distal edge thereof. This will be associated with the outermost peripheral circle of contacts (of which there is only a single contact for the whole note tile). With respect to the half note tile, indicated by a tile 2804, the primary contact 2704 is moved in further to the peripheral circle on which all of the half note contacts are disposed. With respect to the quarter note tile, as indicated by a tile 2806, and also with respect to the eighth note and 16$^{th}$ note tiles, as indicated by tiles 2808 and 2810, the primary contacts 2704 are moved progressively inward to be associated with the associated contacts on the associated peripheral circles and the contacts disposed thereon.

Figure 28B:
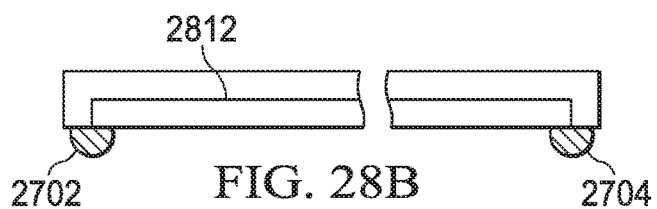
Figure 28C:
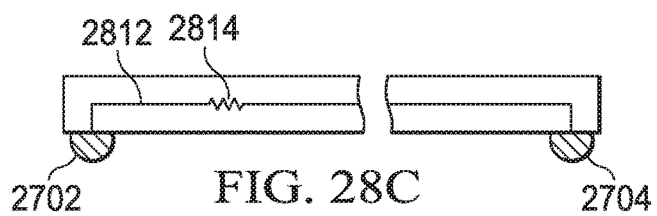

Referring now to FIG. 28B, there is illustrated a cross-sectional view of one of the tiles, illustrating an internal short circuit wire 2812 disposed between the contact 2702 and the contact 2704. In this configuration, this serves to provide an indication of the size of that note. However, it may be that more information is required with respect to each note such as fractions, percentages, decimal numbers, degree of angles, the name of the note, or even a particular musical tone for the note. In this situation, a resistor 2814 is disposed between the contact 2702 and a contact 2704 to provide some value to the particular tile, as indicated in FIG. 28C.

Figure 29:
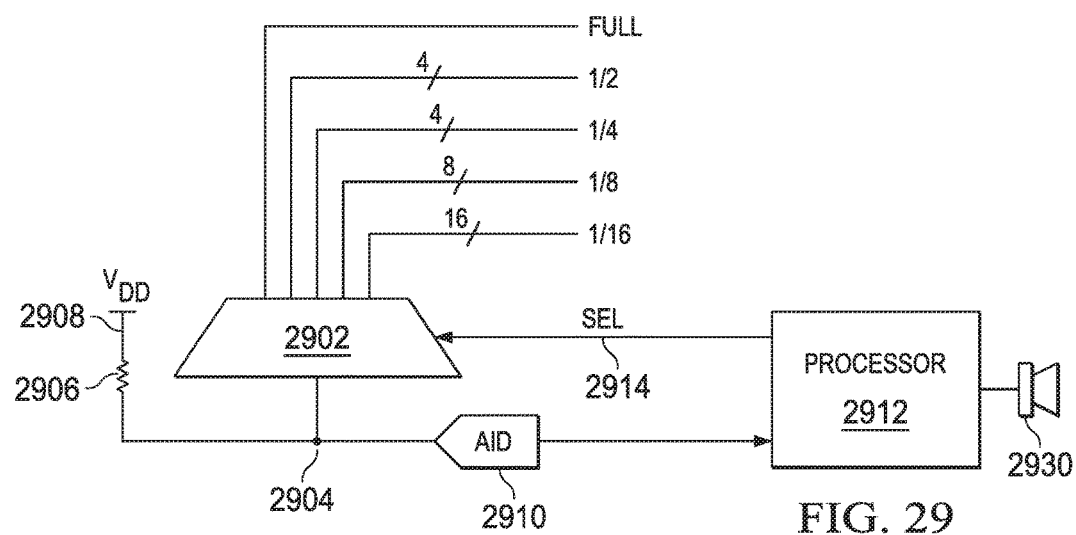
FIG. 29 illustrates a diagrammatic view of circuitry for selectively sampling the presence of any tile in any sector.
Figure 29A:
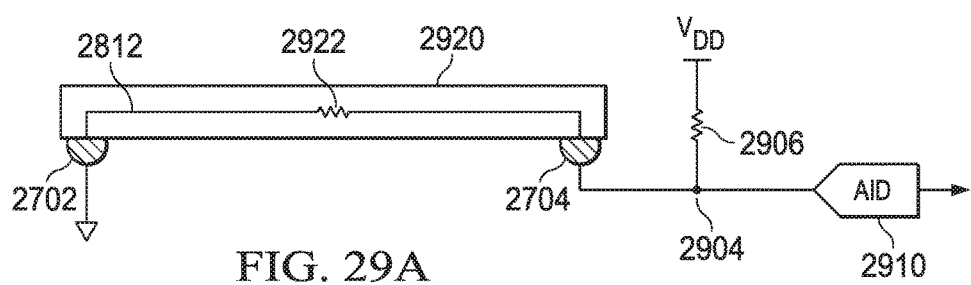
FIG. 29A illustrates a cross-sectional view of the internal connection of the resistor between the input of the A/D Converter and ground for measuring the presence thereof.

Referring now to FIG. 29, there is illustrated a diagrammatic view of a processor-based system for sampling the tiles to determine the presence of a tile and the particular characteristics of a tile, if such is provided. Each of the contacts for each of the peripheral circuits associated with each of the tiles for a given note size will be input to a multiplexer 2902. There will be one contact for the whole note tile, four contacts for the half note tile, four contacts for the quarter note tile, eight contacts for the eighth note tile, and sixteen contacts for the 16$^{th}$ note tile. Each of these must be sampled to determine if there is a tile present and, if present, if it has some value associated therewith. The output of the multiplexer 2902 is input to a node 2904 which is connected through a primary resistor 2906 to a voltage supply on a node 2908. The note 2904 is sampled by an analog/digital (A/D) converter 2910, which the output thereof is input to a processor 2912. The processor 2912 is operable to output a control signal 2914 to operate the multiplexer 2902. The processor 2912 basically steps the multiplexer 2902 through a selection of each of the wires to measure the appropriate output value Referring now to FIG. 29A, there is illustrated a diagrammatic view of a tile 2920 with a resistor 2922 disposed between the ground contact 2702 and the primary contact 2704. The primary contact 2704 is connected to the note 2904 and disposed between the note 2904 and grounds. This will place the resistor 2906 in series with the supply voltage and resistor 2922, which resistor 2922 could be a short circuit wire. Thus, the A/D converter 2904 will measure the voltage equal to the supply voltage when there is no tile disposed on any contact during the sampling thereof. If a short-circuit is placed thereon, the A/D converter 2910 will measure a zero voltage. When the resistor 2922 is present, a voltage between zero and the supply voltage will measure, giving an indication of the value of that resistor 2922. This different value can give certain characteristics to the overall tile.

The processor 2912 drives a speaker 2930 that allows a processor 2912 to analyze all, and determining the particular sequence of, note tiles disposed around the perimeter in a clockwise direction. The actual sequence can then be directly output from the speaker 2930 without intervention of a user other than to place the tiles in the tool. Thus, the processor 2912 is able to recognize the presence of the tiles, the note size associated with those tiles, and other characteristics of each tile in order to reproduce the appropriate sound. It will be understood that other methods may be used to detect the presence and type of tile. For instance, instead of the system of contacts provided above, each tile could have a barcode that is scanned. Other embodiments may also have optical scanners, RFID scanners, or other means for detecting the tiles.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus, comprising:
   an object having thereon a surface defining a circle, the circle being divided into quadrants;
   a plurality of electrical contacts arranged on the surface of the object;
   a plurality of circular sector objects of various sizes in relation to the circle that can be placed into the quadrants of the circle in order to fill the circle with the plurality of circular sector objects,
   wherein the plurality of circular sector objects have displayed thereon a music note according to a size of a particular circular sector object,
   wherein the electrical contacts are arranged in predetermined positions and sized to discriminate between different sizes of the plurality of circular sector objects,
   wherein each of the circular sector objects include one or more contacts protruding from an underside of the respective circular sector object and positioned to interface with select ones of the plurality of electrical contacts such that the one or more contacts interact with one or more of the plurality of electrical contacts arranged on the surface of the object when the circular sector object is placed in the circle in such a positional manner to discriminate between sizes, wherein a number of the one or more contacts protruding from each circular sector object varies based on a size of a particular circular sector object, wherein each of the electrical contacts arranged on the surface of the object and each one of the one or more contacts protruding from the circular sector objects are dimensioned with a length such that the electrical contacts arrange on the surface of the object and the one or more contacts protruding from the circular sector objects interact when there is a misalignment of the circular sector objects when placed in into the circle, and wherein the plurality of circular sector objects further include a plurality of information displayed on each one of the plurality of circular sector objects, the plurality of information displayed on each one of the plurality of circular sector objects being associated with the size of a particular circular sector object; and a multiplexer electrically connected to the plurality of electrical contacts and configured to receive an input in response to one or more of the electrical contacts interacting with one or more of the contacts protruding from the plurality of circular sector objects;

a speaker; and a processor electrically connected to the multiplexer and the speaker and configured to output audio signals to the speaker in response to one or more of the electrical contacts interacting with one or more of the contacts disposed on protruding from the plurality of circular sector objects, wherein the audio signals provide a rhythm based on a combination of the circular sector objects placed into the quadrants of the circle.

2. The apparatus of claim 1, wherein each one of the plurality of circular sector objects is a particular size that represents one of:

the size of the circle;
half the size of the circle;
one quarter of the size of the circle;
one eighth of the size of the circle; or
one sixteenth of the size of the circle.

3. The apparatus of claim 2, wherein the plurality of information displayed on each one of the plurality of circular sector objects includes a music note that corresponds to the size of the particular circular sector object in relation to the size of the circle, with a whole note being displayed on the circular sector objects that are the size of the circle, a half note being displayed on the circular sector objects that are half the size of the circle, a quarter note being displayed on the circular sector objects that are one quarter of the size of the circle, an eighth note being displayed on the circular sector objects that are one eighth of the size of the circle, and a sixteenth note being displayed on the circular sector objects that are one sixteenth of the size of the circle.

4. The apparatus of claim 3, wherein the plurality of information displayed on each one of the plurality of circular sector objects includes fractions, decimal values, money values, and percentages that correspond to the size of the particular circular sector object in relation to the size of the circle.

5. The apparatus of claim 4, wherein the plurality of information displayed on each one of the plurality of circular sector objects includes angles in degrees of a central angle of the particular circular sector object.

6. The apparatus of claim 1, wherein the circle has displayed at 0° a numeral of 12, at 90° a numeral of 3, at 180° a numeral of 6, and at 270° a numeral of 9.

7. The apparatus of claim 6, wherein the circle has displayed at 0° a designation of north, at 90° a designation of east, at 180° a designation of south, and at 270° a designation of west.

8. A method for operating an apparatus, comprising:

receiving within quadrants of a circle, the circle being defined on a surface of an object that includes a plurality of electrical contacts arranged on the surface of the object, a plurality of circular sector objects of various sizes in relation to the circle, the plurality of circular sector objects having displayed thereon a music note according to a size of a particular circular sector object, wherein the electrical contacts are arranged in predetermined positions and sized to discriminate between different sizes of the plurality of circular sector objects, wherein each of the circular sector objects include one or more contacts protruding from an underside of the respective circular sector object and positioned to interface with select ones of the plurality of electrical contacts such that the one or more contacts interact with one or more of the plurality of electrical contacts arranged on the surface of the object when the circular sector object is placed in the circle in such a positional manner to discriminate between sizes, wherein a number of the one or more contacts protruding from each circular sector object varies based on a size of a particular circular sector object, and wherein each of the electrical contacts arranged on the surface of the object and each one of the one or more contacts protruding from the circular sector objects are dimensioned with a length such that the electrical contacts arrange on the surface of the object and the one or more contacts protruding from the circular sector objects interact when there is a misalignment of the circular sector objects when placed in into the circle;

receiving by a multiplexer an input in response to one or more of the electrical contacts interacting with one or more of the contacts protruding from the plurality of circular sector objects;

outputting audio signals by a processor to a speaker in response to one or more of the electrical contacts interacting with one or more of the contacts protruding from the plurality of circular sector objects, wherein the audio signals provide a rhythm based on a combination of the circular sector objects placed into the quadrants of the circle; and analyzing a plurality of information displayed on each one of the plurality of circular sector objects, the plurality of information displayed on each one of the plurality of circular sector objects being associated with the size of the particular circular sector object.

9. The method of claim 8, wherein each one of the plurality of circular sector objects is a particular size that represents one of:

the size of the circle;
half the size of the circle;
one quarter of the size of the circle;
one eighth of the size of the circle; or
one sixteenth of the size of the circle.

10. The method of claim 9, wherein the music note displayed on each one of the plurality of circular sector objects corresponds to the size of the particular circular sector object in relation to the size of the circle, with a whole note being displayed on the circular sector objects that are the size of the circle, a half note being displayed on the circular sector objects that are half the size of the circle, a quarter note being displayed on the circular sector objects that are one quarter of the size of the circle, an eighth note being displayed on the circular sector objects that are one eighth of the size of the circle, and a sixteenth note being displayed on the circular sector objects that are one sixteenth of the size of the circle.

11. The method of claim 10, wherein the plurality of information displayed on each one of the plurality of circular sector objects includes fractions, decimal values, money values, and percentages that correspond to the size of the particular circular sector object in relation to the size of the circle.

12. The method of claim 11, wherein the plurality of information displayed on each one of the plurality of circular sector objects includes angles in degrees of a central angle of the particular circular sector object.

13. The method of claim 8, wherein the circle has displayed at 0° a numeral of 12, at 90° a numeral of 3, at 180° a numeral of 6, and at 270° a numeral of 9.

14. The method of claim 13, wherein the circle has displayed at 0° a designation of north, at 90° a designation of east, at 180° a designation of south, and at 270° a designation of west.

15. The method of claim 8, wherein the step of outputting further includes the music notes being output in an order in which they appear on the circular sector objects beginning at 0° of the circle and moving clockwise around the circle, each beat of the rhythm being associated with each quadrant of the circle and each music note displayed on the circular sector objects within a single quadrant being output within one beat of the rhythm.

* * * * *